US012578291B1

(12) United States Patent
Balcom et al.

(10) Patent No.: US 12,578,291 B1
(45) Date of Patent: Mar. 17, 2026

(54) MAGNETIC RESONANCE METHODS AND DEVICES FOR CHARACTERIZING A PATTERN OF FLOW OF A FLUID

(71) Applicants: Bruce J. Balcom, Fredericton (CA); Michael M. B. Ross, St. Andrews (CA); Jiangfeng Guo, Beijing (CN); Benedict Newling, Fredericton (CA)

(72) Inventors: Bruce J. Balcom, Fredericton (CA); Michael M. B. Ross, St. Andrews (CA); Jiangfeng Guo, Beijing (CN); Benedict Newling, Fredericton (CA)

(73) Assignee: THE UNIVERSITY OF NEW BRUNSWICK, Fredericton (CA)

( * ) Notice: Subject to any disclaimer, the term of this patent is extended or adjusted under 35 U.S.C. 154(b) by 273 days.

(21) Appl. No.: 17/728,063

(22) Filed: Apr. 25, 2022

Related U.S. Application Data

(60) Provisional application No. 63/178,891, filed on Apr. 23, 2021.

(51) Int. Cl.
*G01N 24/08* (2006.01)
*G01F 1/74* (2006.01)

(52) U.S. Cl.
CPC .............. *G01N 24/082* (2013.01); *G01F 1/74* (2013.01)

(58) Field of Classification Search
CPC ......... G01N 24/082; G01F 1/74; G01F 1/708; G01F 1/716; G01R 33/5616
(Continued)

(56) References Cited

U.S. PATENT DOCUMENTS 5,532,593 A * 7/1996 Maneval .............. G01R 33/563
324/306
5,810,727 A * 9/1998 Groen .............. G01R 33/56308
324/309
(Continued)

FOREIGN PATENT DOCUMENTS

CN 108254588 A * 7/2018 ................ G01P 5/00
EP 3039401 B1 * 11/2020 ............. G01N 11/08

OTHER PUBLICATIONS

Liao et al.; Translation of CN108254588A; Pub. Date Jul. 6, 2018; Translated by Clarivate Analytics (Year: 2018).*
(Continued)

*Primary Examiner* — Alesa Allgood
*Assistant Examiner* — Rahul Maini
(74) *Attorney, Agent, or Firm* — Eugene Derenyi; Fogler, Rubinoff LLP

(57) ABSTRACT

A magnetic resonance method and device for characterizing the pattern of flow of a flowing fluid including the steps of flowing the fluid through a conduit, wherein a segment of the conduit defines a measurement volume, subjecting the flowing fluid in the measurement volume to a magnetic field gradient generally in the direction of flow of the fluid, wherein the magnetic field gradient in the direction of flow comprises a generally fixed value in the measurement volume, and a magnetic resonance pulse, acquiring at least one odd echo from the magnetic resonance pulse, wherein the echo comprises signals from streamlines in the flowing fluid in the measurement volume, processing the signals to determine a flow behaviour index for the flowing fluid, determining an average velocity of the flowing fluid, and calculating velocity as a function of the radius of the conduit using the flow behaviour index and the average velocity and
(Continued)

relating the function to a pattern of flow to characterize the pattern of flow exhibited by the flowing fluid.

8 Claims, 18 Drawing Sheets

(58) Field of Classification Search
USPC .......................................................... 324/306
See application file for complete search history.

(56) References Cited

U.S. PATENT DOCUMENTS

| | | | | |
|---|---|---|---|---|
| 10,809,338 | B2 | 10/2020 | Rapoport et al. | |
| 11,378,506 | B2 * | 7/2022 | Marum | G01N 11/08 |
| 2004/0140800 | A1 * | 7/2004 | Madio | G01V 3/32 |
| | | | | 324/306 |
| 2016/0077026 | A1 * | 3/2016 | Pusiol | G01R 33/56308 |
| | | | | 324/306 |

OTHER PUBLICATIONS

Yamada, M., M. Nakashima, and M. Seki, "Pinched flow fractionation: continuous size separation of particles utilizing a laminar flow profile in a pinched microchannel," Anal. Chem. 76(18), 5465-5471 (2004).
Eshtiaghi, N., F. Markis, S. D. Yap, J. C. Baudez, and P. Slatter, "Rheological characterisation of municipal sludge: a review," Water Res. 47(15), 5493-5510 (2013).
Callaghan, P. T., "Rheo-NMR and velocity imaging," Curr. Opin. Colloid Interface Sci. 11(1), 13-18 (2006).
Havisto, S., M. J. Cardona, J. Salmela, R. L. Powell, M. J. Mccarthy, M. Kataja, and A. I. Koponen, "Experimental investigation of the flow dynamics and rheology of complex fluids in pipe flow by hybrid multi-scale velocimetry," Exp. Fluids 58(11), 1-13 (2017).
Kim, S.K., "Flow-rate based method for velocity of fully developed laminar flow in tubes." J. Rheol. 62(6), 1397-1407 (2018).
Coussot, P., "Progress in rheology and hydrodynamics allowed by NMR or MRI techniques," Exp. Fluids 61(9), 1-20 (2020).
Gladden, L. F., and A. J. Sederman, "Recent advances in flow MRI," J. Magn. Reson, 229, 2-11 (2013).
Edelhoff, D., L. Walczak, S. Henning, F. Weichert, and D. Suter, "High-resolution MRI velocimetry compared with numerical simulations," J. Magn. Reson. 235, 42-49 (2013).
Pope, J. M., and S. Yao, "Quantitative NMR imaging of flow," Concept. Magn. Reson. 5(4), 281-302 (1993).
Fukushima, E., "Nuclear magnetic resonance as a tool to study flow," Annu. Rev. Fluid Mech. 31(1), 95-123 (1999).
Elkins, C. J., and M. T. Alley, "Magnetic resonance velocimetry: Applications of magnetic resonance imaging in the measurement of fluid motion," Exp. Fluids 43(6), 823-858 (2007).
Lim, V., A. M. Hobby, M. J. Mccarthy, and K. L. Mccarthy, "Laminar mixing of miscible fluids in a SMX mixer evaluated by magnetic resonance imaging (MRI)," Chem. Eng. Sci.137, 1024-1033 (2015).
Gibbs, S. J., D. E. Haycock, W. J. Frith, S. Ablett, and L. D. Hall, "Strategies for rapid NMR rheometry by magnetic resonance imaging velocimetry," J. Magn. Reson. 125(1), 43-51 (1997).
Wu, D. H., A. I. D. I. Chen, and C. S. Johnson, "Flow imaging by means of 1D pulsed-field-gradient NMR with application to electroosmotic flow," J. Magn. Reson. Series A 115(1), 123-126 (1995).
Blythe, T. W., A. J. Sederman, J. Mitchell, E. H. Stitt, A. P. E. York, and L. F. Gladden, "Characterising the rheology of non-Newtonian fluids using PFG-NMR and cumulant analysis," J. Magn. Reson, 255, 122-131 (2015).
Blythe, T. W., A. J. Sederman, E. H. Stitt, A. P. York, and L. F. Gladden, "PFG NMR and Bayesian analysis to characterise non-Newtonian Buids," J. Magn. Reson. 274, 103-114 (2017).

Adair, A., S. Richard, and B. Newling, "Gas and liquid phase imaging of foam flow using pure phase encode magnetic resonance imaging," Molecules 26(1), 28 (2021).
Zhang, J., and B. J. Balcom, "Magnetic resonance imaging of two-component liquid-liquid flow in a circular capillary tube," Phys.Rev. E 81(5), 056318 (2010).
Li, T. Q., J. D. Seymour, R. L. Powell, K. L. Mccarthy, L. Ödberg, and M. J. Mccarthy, "Turbulent pipe flow studied by time-averaged NMR imaging: measurements of velocity profile and turbulent intensity," Magn. Reson. Imaging 12(6), 923-934 (1994).
Gach, H. M., and I. J. Lowe, "Characterization of flow emerging from a stenosis using MRI," Magn. Reson. Med. 40 (4), 559-570 (1998).
Newling, B., C. C. Poirier, Y. Zhi, J. A. Rioux, A. J. Coristine, D. Roach, and B. J. Balcom, "Velocity imaging of highly turbulent gas flow," Phy. Rev. Lett. 93(15), 154503 (2004).
Tayler, A. B., D. J. Holland, A. J. Sederman, and L. F. Gladden, "Exploring the origins of turbulence in multiphase flow using compressed sensing MRI," Phys. Rev. Lett. 108(26), 264505 (2012).
Gummerson, R. J., C. Hall, W. D. Hoff, R. Hawkes, G. N. Holland, and W. S. Moore, "Unsaturated water flow within porous materials observed by NMR imaging," Nature 281(5726), 56-57 (1979).
Granwehr, J., E. Harel, S. Han, S. Garcia, A. Pines, P. N. Sen, and Y. Q. Song, "Time-of-flight flow imaging using NMR remote detection," Phys. Rev. Lett. 95(7), 075503 (2005).
Li, L., Q. Chen, A. E. Marble, L. Romero-Zeron, B. Newling, and B. J. Balcom, "Flow imaging of fluids in porous media by magnetization prepared centric-scan SPRITE," J. Magn. Reson. 197(1), 1-8 (2009).
Suryan, G., "Nuclear resonance in flowing liquids," In Proceedings of the Indian Academy of Sciences—Section A, Springer India (1951).
Singer, J. R., "Blood flow rates by nuclear magnetic resonance measurements," Science 130(3389), 1652-1653 (1959).
Hirschel, L. R., and L. F. Libelo, "NMR signal dependence on fluid velocity," J. Appl. Phys. 33(5), 1895-1896 (1962).
Arnold, D. W., and L. E. Burkhart, "Spin-echo NMR response from a flowing sample," J. Appl. Phys. 36(3), 870-871 (1965).
Stejskal, E. O., "Use of spin echoes in a pulsed magnetic-field gradient to study anisotropic, restricted diffusion and flow," J. Chem. Phys. 43(10), 3597-3603 (1965).
Grover, T., and J. R. Singer, "NMR spin-echo flow measurements," J. Appl. Phys. 42(3), 938-940 (1971).
Hayward, R. J., K. J. Packer, and D. J. Tomlinson, "Pulsed field-gradient spin echo NMR studies of flow in fluids," Mol. Phys. 23(6), 1083-1102 (1972).
Song, Y. Q., and U. M. Scheven, "An NMR technique for rapid measurement of flow," J. Magn. Reson, 172(1), 31-35 (2005).
Fridjonsson, E. O., P. L. Stanwix, and M. L. Johns, "Earth's field NMR flow meter: Preliminary quantitative measurements," J. Magn. Reson. 245, 110-115 (2014).
Osan, T. M., J. M. Olle, M. Carpinella, L. M. C. Cerioni, D. J. Pusiol, M. Appel, J. Freeman, and I. Espejo, "Fast measurements of average flow velocity by Low-Field 1H NMR," J. Magn. Reson. 209(2), 116-122 (2011).
Richard, S. J., and B. Newling, "Measuring flow using a permanent magnet with a large constant gradient," Appl. Magn. Reson. 50(5), 627-635 (2019).
Chen, W., L. Xiao, H. Liu, G. Liao, W. Liu, Y. Zhang, Q. Wu, Z. Sun, and W. Zheng, "Design and implementation of a robust NMR fluid analyzer with multiple antennas," Appl. Magn. Reson, 50(1), 263-275 (2019).
O'Neill, K. T., E. O. Fridjonsson, P. L. Stanwix, and M. L. Johns, "Quantitative velocity distributions via nuclear magnetic resonance flow metering," J. Magn. Reson. 269, 179-185 (2016).
O'Neill, K. T., A. Klotz, P. L. Stanwix, E. O. Fridjonsson, and M. L. Johns, "Quantitative multiphase flow characterisation using an Earth's field NMR flow meter," Flow Meas. Instrum. 58, 104-111 (2017).
O'Neill, K. T., L. Brancato, P. L. Stanwix, E. O. Fridjonsson, and M. L. Johns, "Two-phase oil/water flow measurement using an Earth's field nuclear magnetic resonance flow meter," Chem. Eng. Sci. 202, 222-237 (2019).

(56)    References Cited

OTHER PUBLICATIONS

Packer, K. J., "The study of slow coherent molecular motion by pulsed nuclear magnetic resonance," Mol. Phys. 17 (4), 355-368 (1969).

Archibald, R., and A. Gelb, "A method to reduce the Gibbs ringing artifact in MRI scans while keeping tissue boundary integrity," IEEE Trans. Med. Imaging 21(4), 305-319 (2002).

Zhong, L., M. Oostrom, M. J. Truex, V. R. Vermeul, and J. E. Szecsody, "Rheological behavior of xanthan gum solution related to shear thinning fluid delivery for subsurface remediation," J. Hazard. Mater. 244, 160-170 (2013).

Benson, T. B., and P. J. Mcdonald, "Profile amplitude modulation in stray-field magnetic-resonance imaging," J. Magn. Reson. Series A 112(1), 17-23 (1995).

Gamma function, Wikipedia entry, retrieved Oct. 10, 2025.

A. M. Karim, "Experimental dynamics of Newtonian and non-Newtonian droplets impacting liquid surface with different rheology," Phys. Fluids 32(4), 043102 (2020).

B. Sharma and R. N. Barman, "Steady laminar flow past a slotted circular cylinder," Phys. Fluids 32(7), 073605 (2020).

M. Malik, R. Bouffanais, and M. Skote, "Viscoelastic laminar drag bounds in pipe flow," Phys. Fluids 32(3), 031702 (2020).

M. Bonesi, D. Churmakov, and I, Meglinski, "Study of flow dynamics in complex vessels using Doppler optical coherence tomography," Meas. Sci. Technol. 18, 3279-3286 (2007).

J. Lauri, A. V. Bykov, A. V. Priezzhev, and R. Myllyla, "Experimental study of the multiple scattering effect on the flow velocity profiles measured in intralipid phantoms by DOCT," Laser Phys. 21, 813-817 (2011).

S. Haavisto, J. Salmela, and A. Koponen, "Accurate velocity measurements of boundary-layer flows using Doppler optical coherence tomography," Exp. Fluids 56, 1-6 (2015).

B. Ouriev and E. J. Windhab, "Rheological study of concentrated suspensions in pressure-driven shear flow using a novel in-line ultrasound Doppler method." Exp. Fluids 32, 204-211 (2002).

J. Wiklund and M. Stading, "Application of in-line ultrasound Doppler-based UVP-PD rheometry method to concentrated model and industrial suspensions," Flow Meas. Instrum. 19, 171-179 (2008).

E. E. Ehrichs, H. M. Jaeger, G. S. Karczmar, J. B. Knight, V. Y. Kuperman, and S. R. Nagel, "Granular convection observed by magnetic resonance imaging," Science 267, 1632-1634 (1995).

A. Penn, T. Tsuji, D. O. Brunner, C. M. Boyce, K. P. Pruessman, and C. R. Muller, "Real-time probing of granular dynamics with magnetic resonance," Sci. Adv. 3, e1701879 (2017).

L. Fullard, D. J. Holland, P. Galvosas, C. Davies, P. Y. Lagree, and S. Popinet, "Quantifying silo flow using MRI velocimetry for testing granular flow models," Phys. Rev. Fluids 4, 074302 (2019).

A. B. Tayler, D. J. Holland, A. J. Sederman, and L. F. Gladden, "Exploring the origins of turbulence in multiphase flow using compressed sensing MRI," Phys. Rev. Lett. 108, 264505 (2012).

M. Ziegler, J. Lantz, T. Ebbers, and P. Dyverfeldt, "Assessment of turbulent flow effects on the vessel wall using four-dimensional flow MRI," Magn. Reson. Med. 77, 2310-2319 (2017).

A. Caprihan and E. Fukushima, "Flow measurements by NMR," Phys. Rep. 198 (4), 195-235 (1990).

Y. Q. Song and U. M. Scheven, "An NMR technique for rapid measurement of flow," J. Magn. Reson. 172(1), 31-35 (2005).

J. Guo, M. M. B. Ross, B. Newling, and B. J. Balcom, "Non-Newtonian fluid velocity profiles determined with simple magnetic resonance spin echoes," Phys. Rev. Appl. 16(2), L021001 (2021).

H. Dong, T. Xia, L. Chen, S. Liu, Y. D. Cui, B. C. Khoo, and A. Zhao, "Study on flow separation and transition of the airfoil in low Reynolds number," Phys. Fluids 31, 103601 (2019).

S. Hamidouche, J. V. Simo Tala, and S. Russeil, "Analysis of flow characteristics downstream delta-winglet vortex generator using stereoscopic particle image velocimetry for laminar, transitional, and turbulent channel flow 7regimes," Phys. Fluids 32(5), 054105 (2020).

R. L. Garwin and H. A. Reich, "Self-diffusion and nuclear relaxation in He3," Phys. Rev. 115(6), 1478-1492 (1959).

M. M. Ross, G. R. Wilbur, P. F. D. J. C. Barrita, and B. J. Balcom, "A portable, submersible, MR sensor—The Proteus magnet," J. Magn. Reson. 326, 106964 (2021).

J. Guo, M. M. B. Ross, B. Newling, M. Lawrence, and B. J. Balcom, "Laminar flow characterization using low-field magnetic resonance techniques," Phys. Fluids 33(10), 103609 (2021).

J. A. Nelder and R. Mead, "A simplex method for function minimization," Comput. J. 7(4), 308-313 (1965).

* cited by examiner

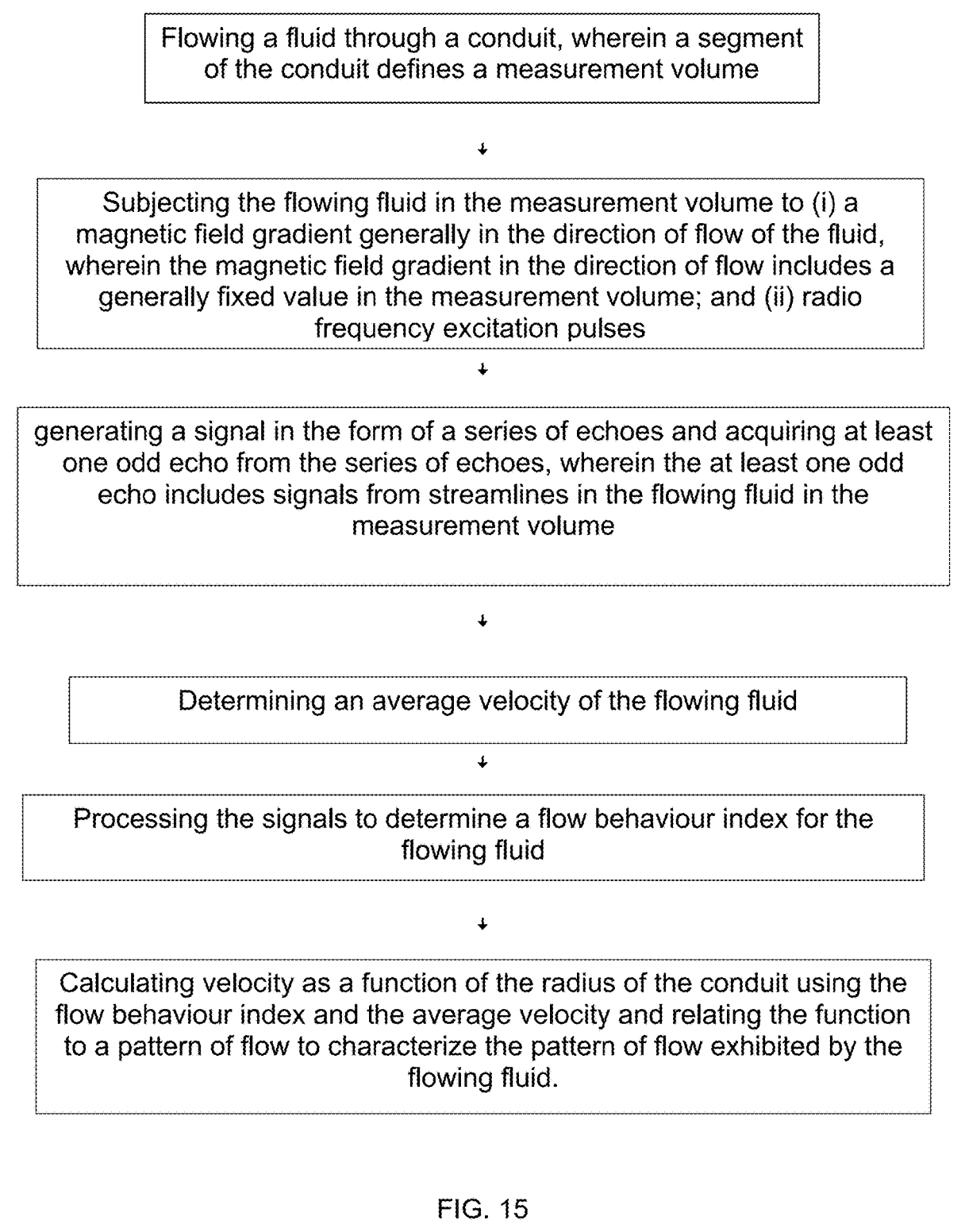

Flowing a fluid through a conduit, wherein a segment of the conduit defines a measurement volume

↓

Subjecting the flowing fluid in the measurement volume to (i) a magnetic field gradient generally in the direction of flow of the fluid, wherein the magnetic field gradient in the direction of flow includes a generally fixed value in the measurement volume; and (ii) radio frequency excitation pulses

↓ generating a signal in the form of a series of echoes and acquiring at least one odd echo from the series of echoes, wherein the at least one odd echo includes signals from streamlines in the flowing fluid in the measurement volume

↓

Determining an average velocity of the flowing fluid

↓

Processing the signals to determine a flow behaviour index for the flowing fluid

↓

Calculating velocity as a function of the radius of the conduit using the flow behaviour index and the average velocity and relating the function to a pattern of flow to characterize the pattern of flow exhibited by the flowing fluid.

FIG. 15

MAGNETIC RESONANCE METHODS AND DEVICES FOR CHARACTERIZING A PATTERN OF FLOW OF A FLUID

CROSS-REFERENCE TO RELATED APPLICATIONS

This application claims the benefit, under 35 U.S.C. § 120 of U.S. Provisional Patent Application Ser. No. 63/178,891, filed Apr. 23, 2021.

FIELD OF THE DISCLOSURE

The present disclosure relates generally to methods and devices for characterizing rheological properties of a fluid in general, and a pattern of flow in particular.

BACKGROUND OF THE DISCLOSURE

Laminar flow, in fluid dynamics, is characterized by each fluid micro element flowing in parallel layers without interference and mixing with the adjacent layers [1]. The characterization of laminar flow, including average velocity and velocity profile, is of considerable value in chemical and allied processing industries [2-4]. Various fluids exhibit different flow behaviours under laminar conditions, dependent on fluid rheological properties [5-8]. Laminar flow characterization is therefore helpful to characterize the rheological properties.

Magnetic resonance/magnetic resonance imaging (MR/MRI) in flow measurements is attractive because of its non-invasive capabilities for measuring optically opaque objects [8-10]. Multiple MR- and MRI-based methods have been reported to characterize fluid flow. MRI-based methods for measuring flows are based on the application of magnetic field gradients, including frequency-, phase-, and motion-encoding gradients, to yield quantitative information about velocity distributions of the flowing fluid [9-15]. There are also some modified MRI-based methods that only use one type of gradient [16-19]. MRI-based methods, resolving flow velocity profiles, have been used to measure various types of flows, for example laminar flow [14, 15, 20], turbulence [21-24], and flow in porous media [25-27]. Unfortunately, these measurements are predominantly performed on laboratory research instruments. The chief challenges of MRI-based methods, for widespread industrial application, are the expense of the superconducting equipment and the demand of the high-performance gradient systems. MR-based methods for flow measurements do not need complicated equipment, as a permanent magnet with a static magnetic field gradient is sufficient. It therefore has wide industrial application prospect and great developmental potential in characterizing fluid flow.

MR-based methods for characterizing flow are based on the effect of flow on the MR signal. Suryan (1951) measured MR signals of flowing water in a U-tube between the pole pieces of a magnet at 20 MHz, and reported the continuous wave MR signal increased as the partially saturated spins are replaced by unsaturated flowing spins [28]. Singer (1959) exploited this principle to demonstrate in vivo flow measurements [29]. Hirschel and Libello (1962) showed the steady state MR signal is a function of fluid velocity in the presence of flow [30]. Arnold and Burkhart (1965) employed a spin echo to study the influence of flow on MR signal under laminar flow conditions [31]. Stejkal (1965), Grover and Singer (1971), and Hayward et al. (1972) extended this work using a pulsed field gradient technique [32-34].

Since the effect of flow on MR signal was first studied, multiple MR-based methods for characterizing flows were reported. These methods can be mainly classified into two categories: (1) net phase accumulation-based techniques [33-35] and (2) magnitude-based time-of-flight techniques [36-39]. Net phase accumulation-based techniques rely on the application of a constant static or pulsed magnetic field gradient in the direction of flow. The phase shift of the signal detected occurs due to flows with a flow-oriented gradient, which is proportional to the average velocity. For example, Song et al. (2005) employed the Multiple Modulation Multiple Echoes (MMME) technique to measure fluid flow with a static magnetic field gradient [35]. A series of coherence pathways were generated by the MMME technique, and each of them exhibits a phase shift dependent on average velocity. Magnitude-based time-of-flight techniques is based on the variation of signal magnitude proportional to the quality of excited spins in the detector, related to flow velocity. This technique does not require the use of any magnetic field gradients. It is therefore very popular to employ this technique in low-cost low-field MR spectrometers. Beyond the two kinds of MR-based methods, O'Neill et al. (2016; 2017; 2019) invented an Earth's field magnetic resonance flow meter to measure the velocity probability distribution and $T_1$-velocity probability distribution of multiphase flow [40-42].

From the descriptions of the existing MR-based methods, it can be found these methods focus on the average velocity of fluid flow, which is insufficient to support the study of fluid rheology.

SUMMARY OF THE DISCLOSURE

The flow behaviour index is an important parameter of fluid rheology, which has a direct impact on flow velocity profile under laminar conditions. Determination of the velocity profile is, therefore, helpful to study fluid rheology. In some aspects of the present disclosure, MR methods are applied to fluid rheology. In other aspects of the present disclosure, MR-based methods are used to characterize flow in a conduit, for example laminar flow in a conduit such as a pipe, including average velocity and velocity profile. In another aspect, the MR methods are based on Carr-Purcell-Meiboom-Gill (CPMG) MR measurements.

A method according to one aspect of the present disclosure relates to a magnetic resonance method for characterizing the pattern of flow of a flowing fluid including the steps of flowing the fluid through a conduit, wherein a segment of the conduit defines a measurement volume, subjecting the flowing fluid in the measurement volume to a magnetic field gradient generally in the direction of flow of the fluid, wherein the magnetic field gradient in the direction of flow comprises a generally fixed value in the measurement volume, and radio frequency excitation pulses, generating a signal in the form of a series of echoes and acquiring at least one odd echo from the series of echoes, wherein the at least one odd echo comprises signals from streamlines in the flowing fluid in the measurement volume, determining an average velocity of the flowing fluid, processing the signals to determine a flow behaviour index for the flowing fluid, and calculating velocity as a function of the radius of the conduit using the flow behaviour index and the average velocity and relating the function to a pattern of flow to characterize the pattern of flow exhibited by the flowing fluid.

A device, according to another aspect of the present disclosure, relates to a palm-sized sensor (hereinafter also referred to as the "Proteus magnet"), with a constant magnetic field gradient, designed to be used for the measurement of fluid flows, including laminar flows. The Proteus magnet in one aspect consists of two portable disk magnets tilted at an angle of 1° from a starting separation of 1.4 cm. Other tilt angles and separations can be used to achieve a magnetic field gradient generally in the direction of the flow of fluid being measured. In one aspect, the Proteus magnet has a 1H resonance frequency of 20.48 MHz to measure laminar flow. However, other suitable resonance frequencies can be used. In some other aspects, methods of the present disclosure relate to a phase-based method, magnitude-based method, and velocity spectrum method as further described in this disclosure to characterize flow in a pipe, including average velocity and velocity profile, from a CPMG measurement. Other suitable MR measurements can be used.

In a method according to another aspect of the present disclosure, a phase shift occurs on the odd echoes during CPMG measurement for flow measurement with a flow-directed constant gradient. The phase accumulation is related to gradient, echo time, and average velocity. A phase-based method according to an aspect of the present disclosure employs multiple odd echo phase accumulations at different echo times to fit the average velocity of flow. In one aspect, only one measurement is required for a varied echo time CPMG scheme to obtain desired data.

In a method according to another aspect of the present disclosure, a normalized magnitude $M_\phi$ of odd echoes, due to the phase accumulation, is derived, dependent on gradient, echo time, average velocity, and flow behaviour index. The magnitude-based method according to one aspect obtains average velocity and flow behaviour index based on the fitting by $M_\phi$ of odd echoes at different echo times. In one aspect, with a modest number (on the order of 10 for example) of odd echo data points at different echo times, the average velocity can be obtained from a phase-based method according to an aspect of the present disclosure, and then fitted to obtain a flow behaviour index, with known average velocity, by the $M_\phi$. A magnitude-based method according to an aspect of the present disclosure provides the possibility that the flow velocity profile is determined with a CPMG measurement.

In a method according to another aspect of the present disclosure, a velocity spectrum method is based on a Fourier transform approach. Due to the fixed gradient of the Proteus magnet, this method changes T during the measurement. The maximum flow velocity can be determined based on the break point in the velocity spectrum. Combined with the average velocity from the phase-based method, flow behaviour index can be resolved, and in turn flow profile is determined.

A CPMG measurement according to another aspect of the method of the present disclosure can be used on low-field MR equipment with a flow-oriented gradient for the determination of a flow velocity profile based on methods according to the present disclosure. Methods according to some aspects of the present disclosure are developed to process the measured data at complete polarization. According to another aspect, a flow measurement, based on the Proteus magnet, requires a short $T_1$ of measured fluid, usually using a contrast agent, to make the detected fluid completely polarized.

The method according to another aspect of the present disclosure relates to a computer-implemented method of processing at least one odd echo acquired from radio frequency pulses of a measurement volume containing a flowing fluid, wherein the echo includes signals from streamlines in the flowing fluid in the measurement volume, processing the signals to determine a flow behaviour index for the flowing fluid, determining an average velocity of the flowing fluid, and calculating velocity as a function of the radius of the conduit using the flow behaviour index and the average velocity and relating the function to a pattern of flow to characterize the pattern of flow exhibited by the flowing fluid.

BRIEF DESCRIPTIONS OF DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 15 is an example of a method for characterizing the pattern of flow of a flowing fluid according to an implementation.

DETAILED DESCRIPTION

Sensor Design and Hardware

Figure 1A:
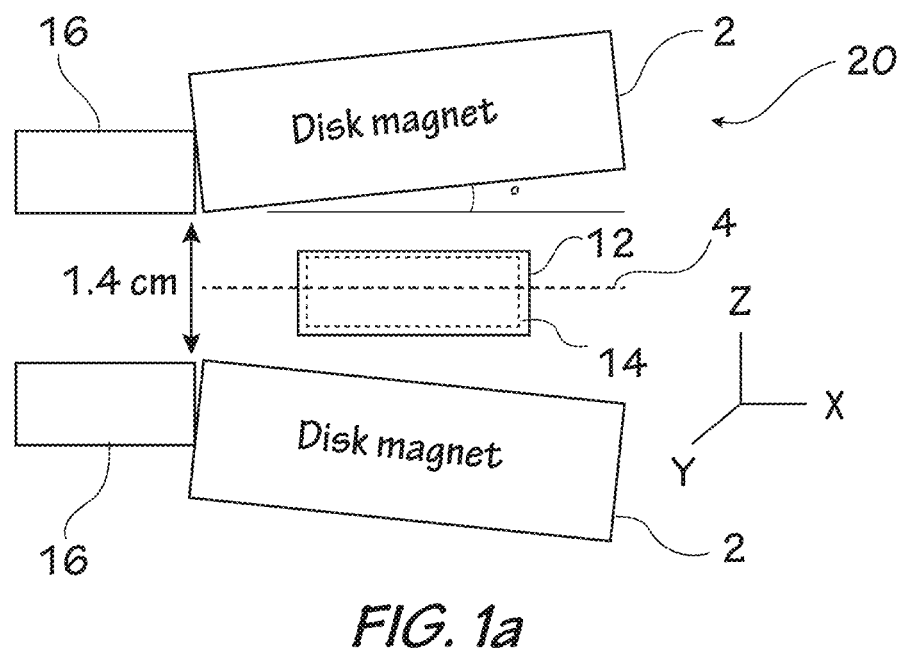
FIG. 1(a) is a schematic diagram of the position of two disk magnets for a Proteus magnet sensor according to an aspect of the present disclosure.

The present invention according to some embodiments relates to an MR sensor, indicated generally at 20 in FIG. 1(a), suitable for use with an NMR measuring device, wherein the sensor includes two disk magnets 2. Varying the distance between the two disk magnets 2, as a function of distance along the symmetry axis, leads to a magnetic field gradient directed along the symmetry axis 4. In one embodiment, the optimal separation and tilt angle for a desired constant gradient of 60 gauss/cm between the two N52 NdFeB K&J Magnetics (Pipersville, PA) disk magnets of 5.1 cm diameter and 1.3 cm thickness was determined via CST Studio Suite (Providence, RI). Referring to FIG. 1(a), each disk magnet 2 was separated and tilted at an angle of 1° from a starting separation of 1.4 cm between the magnets 2 to generate a constant magnetic field gradient directed along the x axis 4 in the central region of the two magnets 2. A design gradient of 60 gauss/cm with this geometry was judged to be near ideal for the flow measurements envisaged. FIG. 1(a) depicts two disk magnets 2, each rotated by 1° about the y axis.

Figure 1B:
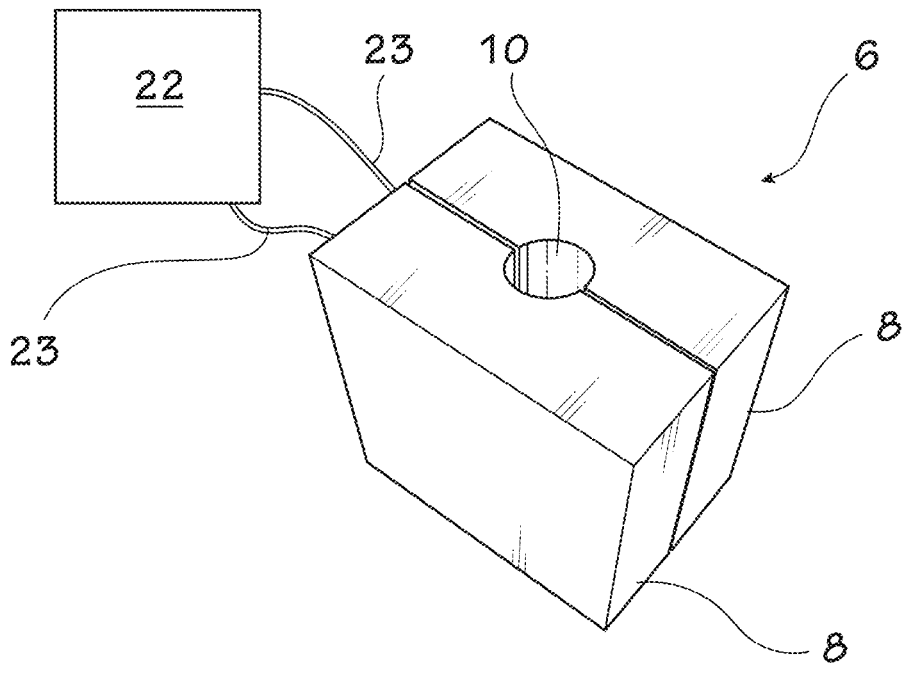
FIG. 1(b) is a photograph of the casing of a sensor according to an aspect of the present disclosure.

Referring to FIG. 1(b), a 6×6×4 cm casing indicated generally at 6 fabricated from Garolite G-10 (McMaster Carr, Elmhurst, IL) was machined to house the magnets. The casing 6 was divided into two separate pieces 8, where each piece had slots (not shown) into which the magnets 2 could be placed. Each slot was machined to permit the 1° tilt relative to the symmetry axis. The casing 6 included a 1 cm diameter cylindrical passageway 10 through the casing 6, along the direction of the imposed gradient (see the x axis in FIG. 1(a)), to permit the placement of a glass tubing conduit to support the flow. A 4-turn solenoidal RF coil was loosely formed around a glass pipe, 0.67 cm inner diameter, and was capacitively matched to 50Ω. The RF coil, fabricated from 0.8 mm diameter copper wire, was centered in the Proteus magnet. The interior and exterior of the sensor (also referred to in this specification as the "Proteus magnet") was wrapped with 0.2 mm copper tape to limit external RF interference and suppress acoustic ringing. FIG. 1(b) shows the picture of the Proteus magnet according to one embodiment of the present invention.

Magnetic field plots of the sensitive spot in the Proteus magnet were acquired with a LakeShore 460 3-Channel Gaussmeter (Westerville, OH) connected to a BiSlide Positioning System and VXM Stepping Motor Controller (Velmex Inc., Bloomfield, NY). Magnetic field data was read and processed through a custom MATLAB script (Mathworks, Natick, MA).

Figure 2A:
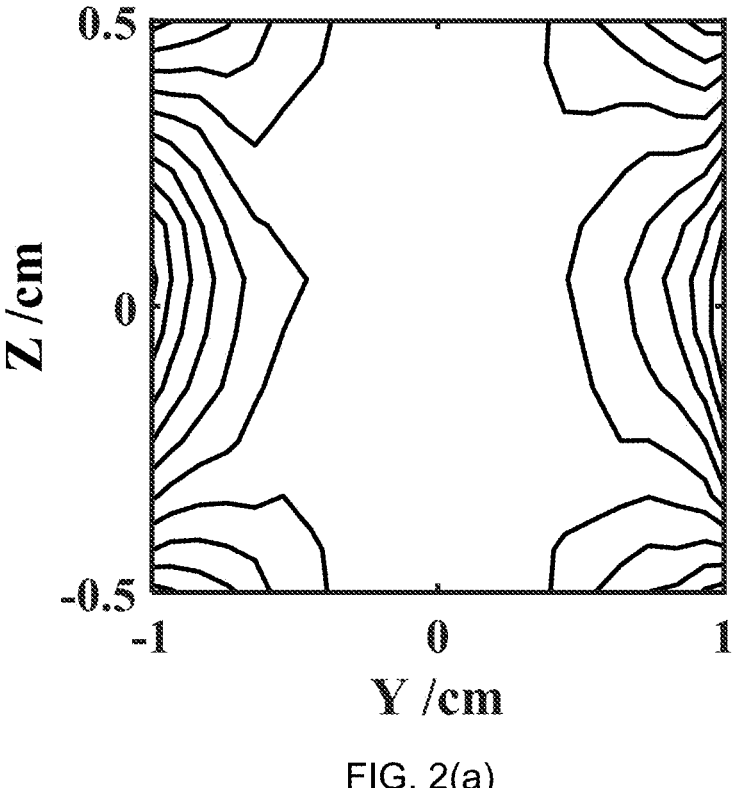
FIG. 2(a) is a plot of simulated 2D magnetic field magnitudes of the tilted Proteus magnet sensor of FIG. 1(a) in the central 2D Y-Z axis plane.
Figure 2B:
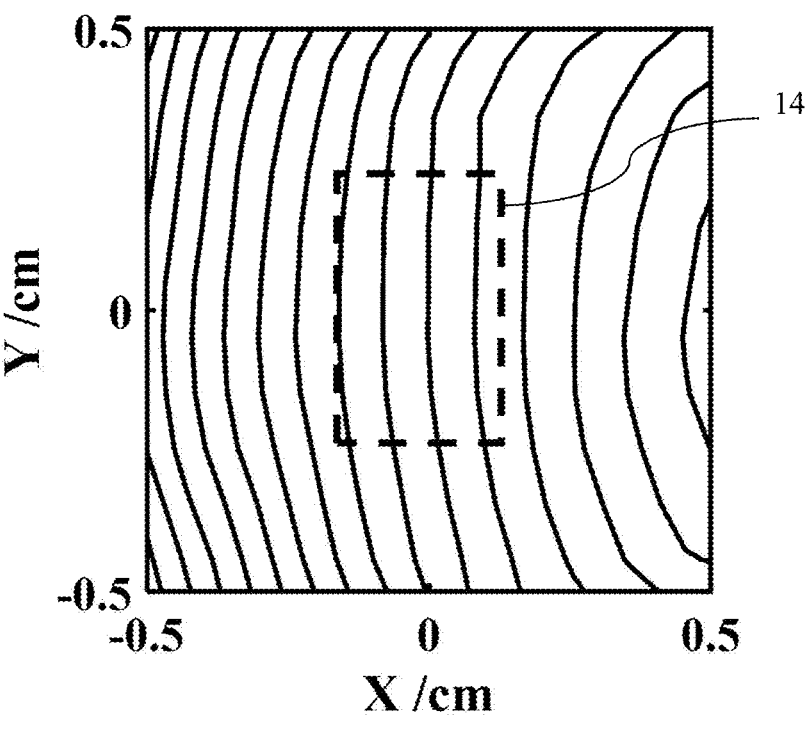
FIG. 2(b) is a plot of simulated 2D magnetic field magnitudes of the tilted Proteus magnet sensor of FIG. 1(a) in the central 2D X-Y axis plane.
Figure 2C:
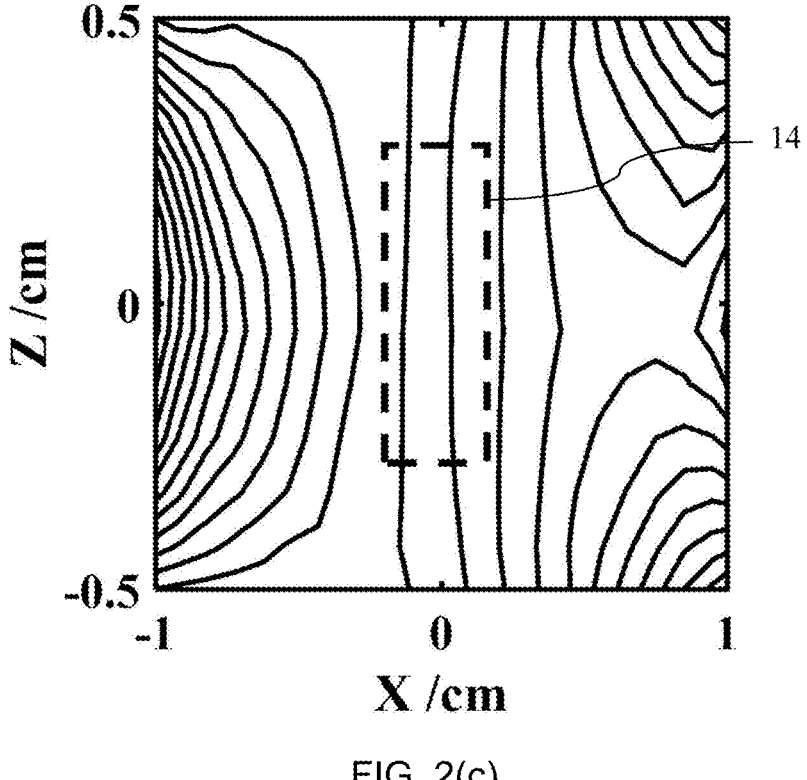
FIG. 2(c) is a plot of simulated 2D magnetic field magnitudes of the tilted Proteus magnet of FIG. 1(a) in the central 2D X-Z axis plane.
Figure 3A:
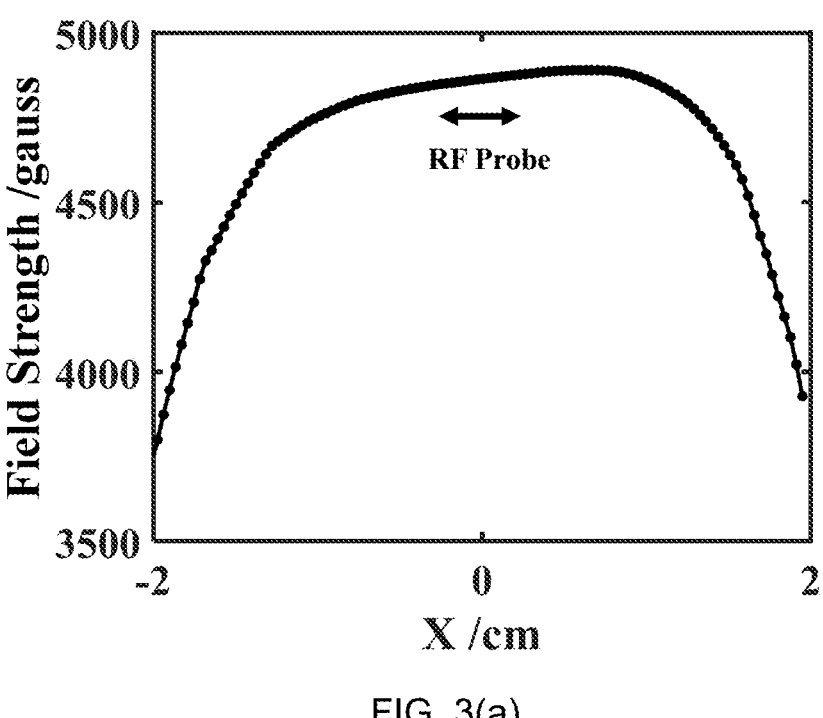
FIG. 3(a) is a graph of 1D field magnitude along the central line of the X-Z transverse plane, obtained from FIG. 2(c)

FIGS. 2(a), 2(b) and 2(c) depict the simulated two-dimensional (2D) magnetic field magnitudes of the tilted Proteus magnet in the Y-Z, X-Y, and X-Z planes. The magnetic field has contributions from $B_x$, $B_y$, and $B_z$, but in all cases $B_z$ dominates. The disk magnets 2 were axially separated by 1.4 cm, with each symmetrically rotated an angle of 1° to generate a design gradient of 60 gauss/cm. The proposed gradient strength was selected on the basis of ability to observe flow rates within an average velocity range of 1-5 cm/s with echo times below 1 ms. FIG. 3(a) is the 1D profile of the magnetic magnitude field along the central axis of the X-Z plane, taken from FIG. 2(c). The 60 gauss/cm gradient $G_x$ is observed ±1.5 cm about the origin in FIG. 3(a). Simulation shows, in the region of the RF CPMG, that gradient $G_x$ is uniform to within 3 gauss/cm when displaced 3.45 mm off the central axis in the X-Y plane and within 2 gauss/cm in the X-Z plane. In order to ensure that the phase-shift measured would be observed in a region of constant gradient, an RF coil (shown as block 12 in FIG. 1(a)) with a length of 0.32 cm and inner diameter of 0.67 cm, 110 mm³ measurement volume 14 (also known as a sample volume), was employed and placed in the centre most region. It is to be understood that other suitable magnet sizes, tilt angles, magnet separation, and design gradient can be used depending upon the particular MR measurement experiment to be carried out.

An RF coil 12 with a length of 0.32 cm and inner diameter of 0.67 cm is placed in the desired measurement volume 14 and shown in stippled lines in FIG. 2(b) and FIG. 2(c). Referring to FIG. 2(a), the field plot in the Y-Z plane is largely uniform within the measurement volume of interest. The field contour interval is 7 gauss. FIG. 2(b) and FIG. 2(c) illustrate the constant gradient within the central region of the magnet that extends ~1.5 cm in X, ~0.7 cm in Y and ~1 cm along Z. Field contour intervals are 6 and 12 gauss, respectively.

Figure 3B:
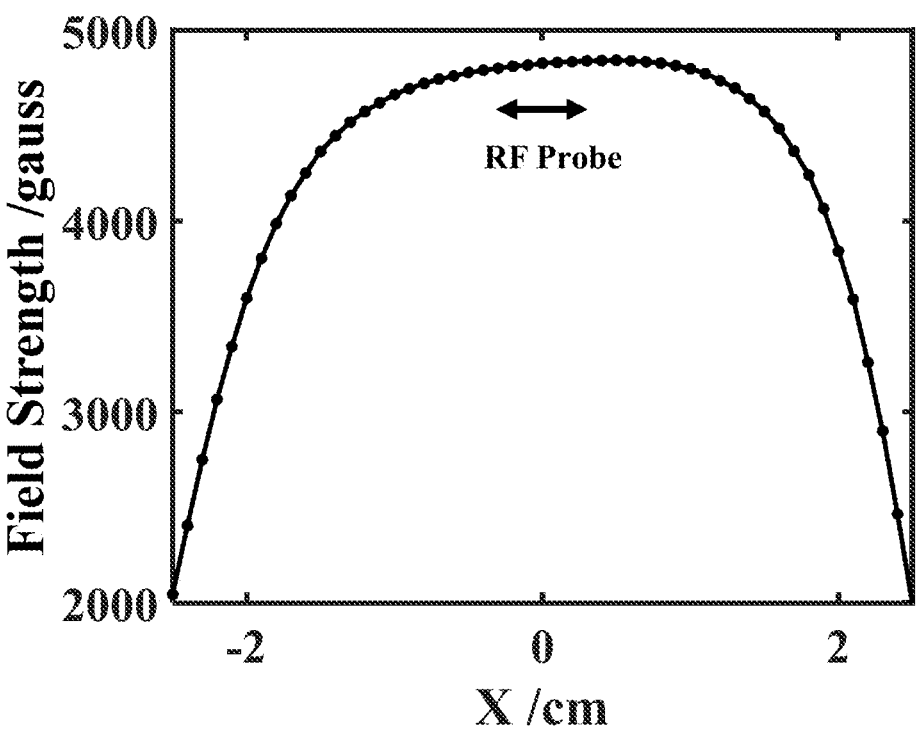
FIG. 3(b) is a graph of 1D field magnitude measured along X with Y=0, Z=0 of the 1° tilted Proteus magnet.

FIG. 3(a) shows 1D field magnitude along the central line of the X-Z transverse plane, obtained from FIG. 2(c). FIG. 3(b) is an experimental field plot of 1D magnetic field magnitude along the X central axis, Y=0, Z=0. As before, the magnetic field has contributions from $B_x$, $B_y$, and $B_z$. The finite size of the field sensor permitted only one axis measurement. From simulation, the region of constant gradient, on axis, was ±1.5 cm about the origin. The experimental field plot showed the region of constant gradient was reduced to 6 mm compared to simulation. The experimental field plot yields a $G_x$ value, near the origin, of 64 gauss/cm. The discrepancies in spatial extent and $G_x$ value from simulation are likely due to non-ideal disk magnets as well as imperfections in the built shell, which houses the magnets. The RF probe was centered about the magnet origin. The Proteus magnet was tuned to a 1H frequency of 20.48 MHz. Average velocity measurements of known water flow were performed to confirm the $G_x$ gradient amplitude of 65 gauss/cm.

The field strength and region of the desired constant gradient are determined coarsely compared to the simulated results, but are, nevertheless, similar. The RF coil of length 0.32 cm and inner diameter of 0.67 cm, 110 mm$^3$ measurement volume, was placed about the central region of the Proteus magnet. Discrepancies observed in the experimental compared to the simulated field are likely indicative of imperfections in the disk magnets or in the geometry of the custom shell housing.

The RF probe was attached to a TecMag (Houston, TX) transcoupler with a N/4 cable via BNC connectors. The transcoupler was joined to a Tomco Technologies (Stepney, Australia) 250 W RF amplifier and a L3 Nard-MITEQ (Hauppauge, NY) 0.7-200 MHz preamplifier with a Mini-Circuits (Toronto, Ontario) 30 MHz low-band-pass filter.

Flow Network

A flow network identical to the setup previously employed in for time-of-flight flow experiments was used to test a Proteus magnet sensor according to an embodiment of the present invention. In this configuration, a gravity-fed flow from a reservoir suspended several feet above the Proteus magnet sensor was refreshed via a pump from another reservoir at floor level to establish a constant flow through the Proteus magnet sensor. To ensure a constant fluid level in the upper reservoir, and therefore a constant pressure head driving the flow, a submersible pump (Hidom Electric, Shenzhen, China) provided more inflow to the upper reservoir than was flowing through the magnet. An overflow was installed in the upper reservoir to return excess water to the lower reservoir. A Masterflex Variable-Area Flowmeter (Cole-Parmer model #RK-32460-34, Montreal, Canada) was used to control the average flow rate. Flexible Fisherbrand clear PVC (Fisher Scientific Company, Ottawa, Canada) with an inner diameter of 0.8 cm was incorporated throughout the construction of the flow network except for the portion running through the magnet, where a 70-cm length of glass tubing with an ID of 0.67 cm was utilized.

Basic Fluid Dynamics

When a power-law fluid flows in a circular pipe under laminar conditions, the shear stress is proportional to the shear rate raise to the power ω, where ω is the flow behaviour index. Assuming the flow direction in x, the constitutive equation can be expressed as [43]

$$\sigma_{xr} = k\dot{\gamma}^{\omega} \tag{1}$$

where $\sigma_{xr}$ is the shear stress on the radial position r, k is the fluid consistency coefficient, $\dot{\gamma}$ is the stress rate and it can be expressed as $$\dot{\gamma} = -\frac{dv(r)}{dr} \tag{2}$$

where v(r) is the flow velocity on the radial position r.

The axial momentum of the fluid in a pipe can be written as $$0 = -\frac{dp}{dz} + \frac{1}{r}\frac{\partial(r\sigma_{xr})}{\partial r}, \tag{3}$$

where $$\frac{dp}{dz} = \frac{\Delta p}{L}$$

is the pressure gradient along the pipe. Integrating Eq. (3) with respect to r, we can obtain $$\sigma_{xr} = \frac{r\Delta p}{2L}. \tag{4}$$

Substituting Eqs. (2) and (4) into Eq. (1), we can obtain $$\frac{r\Delta p}{2L} = -k\left(\frac{dv(r)}{dr}\right)^{\omega}. \tag{5}$$

Integrating Eq. (5) with respect to r, we can obtain the flow velocity profile in a pipe $$v(r) = \left(\frac{\Delta pR}{2kL}\right)^{\frac{1}{\omega}}\frac{\omega R}{\omega+1}\left(1 - \left(\frac{r}{R}\right)^{\frac{1}{\omega}+1}\right). \tag{6}$$

The volume flux Q of the pipe flow can be expressed as $$Q = \int_0^R 2\pi r v(r)dr = \frac{\pi\omega R^3}{1+3\omega}\left(\frac{\Delta pR}{2kL}\right)^{\frac{1}{\omega}} = v_{avg}\pi R^2. \tag{7}$$

Eq. (7) shows $$v_{avg} = \frac{\omega R}{1+3\omega}\left(\frac{\Delta pR}{2kL}\right)^{\frac{1}{\omega}}.$$

Substituting $v_{avg}$ into Eq. (6), we obtain $$v(r) = \frac{3\omega + 1}{\omega + 1} v_{avg}\left(1 - \left(\frac{r}{R}\right)^{\frac{1}{\omega}+1}\right). \tag{8}$$

For computational convenience, we define $$m = \frac{1}{\omega} + 1, \tag{}$$

and then Eq. (8) can be simplified as $$v(r) = \frac{m+2}{m} v_{avg}\left(1 - \left(\frac{r}{R}\right)^m\right). \tag{9}$$

Eq. (9) shows the maximum flow velocity $v_{max}$ at centre of the pipe, under laminar conditions, is related to $v_{avg}$, described as $$v_{max} = \frac{m+2}{m} v_{avg}. \tag{10}$$

Different fluids exhibit different m for pipe flow. For m<2.0 ($\omega$>1), the fluid exhibits shear-thickening behaviour. For m=2.0 ($\omega$=1), the fluid shows Newtonian behaviour. For m>2.0 ($\omega$<1), the fluid shows shear-thinning behaviour. We plot three typical 1D velocity profiles (m=1.5, 2.0, and 5.0) of laminar flow at the same $v_{avg}$=5 cm/s, in FIG. 4. The velocity profile shape depends on m, and the larger the m, the lower the maximum flow velocity at the same $v_{avg}$. With increasing m, the velocity decay gradually slows in the middle of the pipe. Therefore, m and $v_{avg}$ are the two necessary parameters for determining the flow velocity profile.

Figure 4:
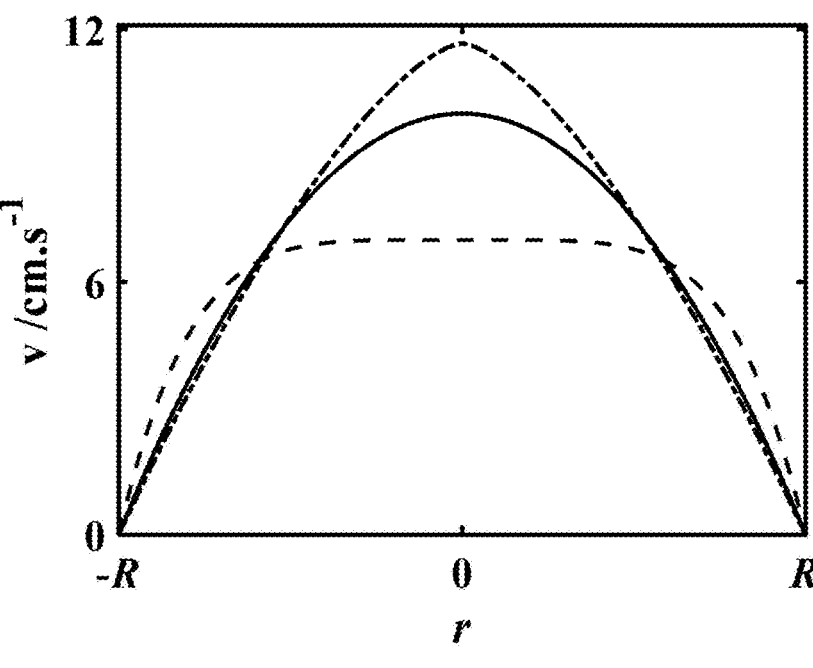
FIG. 4 is a graph of three typical 1D velocity profiles of laminar flows at the same $v_{avg}$=5 cm/s with m=1.5, 2.0, and 5.0.

FIG. 4 is a graph of three typical 1D velocity profiles of laminar flows at the same $v_{avg}$=5 cm/s with m=1.5 (———), 2.0 (—), and 5.0 (———). The velocity profile shape varies from m, and the larger m, the lower maximum flow velocity. The velocity decay gradually slows in the middle of pipe as m increases.

Flow Parameter Determination from CPMG Measurement

Phase-Based Method

The CPMG MR method is composed of a $90_x°$ pulse followed by a series of $180_y°$ pulses with 2τ time spacing. This measurement can be described as $$90_x°-[\tau-180_y°-\tau-\text{echo}]_n. \tag{11}$$

Each $180_y°$ pulse refocuses the magnetization to generate an echo at the time t=2nτ, where n denotes the nth spin echo during the CPMG measurement. When the CPMG measurement is performed for fluid flow with a constant magnetic field gradient (G) in the direction of flow, a phase shift for all odd echoes will occur. For a constant velocity $v_c$, the net phase accumulation $\phi_c$ of odd echoes can be expressed as [11, 44]

$$\phi_c = \gamma G v_c \tau^2, \tag{12}$$

where $\gamma$ is the gyromagnetic ratio. A detailed derivation is given in the Appendix A section of this specification.

For a steady flow, with a distribution of flow velocities, the net phase accumulation $\phi_{odd}$ of odd echoes can be expressed as $$\phi_{odd} = \frac{1}{J}\gamma G\tau^2\left(\sum_{j=1}^J v_j\right) = \gamma G\tau^2\left(\frac{1}{J}\sum_{j=1}^J v_j\right) = \gamma G v_{avg}\tau^2, \tag{13}$$

where $v_{avg}$ is the average velocity. For a general laminar flow in a pipe, we can also calculate the net phase accumulation $\phi_{odd}$ of odd echoes by integration $$\phi_{odd} = \frac{\int\int \phi r dr d\theta}{\int\int r dr d\theta} = \frac{\int_0^R \phi r dr}{\int_0^R r dr} = \frac{\int_0^R (\gamma G v(r)\tau^2) r dr}{\int_0^R r dr}$$

$$= \gamma G\tau^2 \frac{\int_0^R \left(v_{max}\left(1 - \frac{r^m}{R^m}\right)\right) r dr}{\int_0^R r dr} = \frac{m}{m+2} v_{max}\gamma G\tau^2$$

$$= \gamma G v_{avg}\tau^2, \tag{14}$$

where R is the pipe radius.

It can be seen from Eqs. (13)-(14) that the $\phi_{odd}$ depends on G, $v_{avg}$ and τ, and therefore $v_{avg}$ can be determined from $v_{avg}=\phi_{odd}/\gamma G\tau^2$. The $v_{avg}$, determined from net phase accumulation of an echo, suffers from the signal-to-noise ratio (SNR) of the echo measured. In another embodiment, to obtain $v_{avg}$ more reliably, multiple odd echo phase accumulations at different r were employed. The odd echo net phase accumulations at different l2 were fitted by Eq. (13), and the slope k can be used to determine $v_{avg}=k/\gamma G$. This method means that many times of measurements of the traditional CMPG are needed. Theoretically, just one measurement is needed to meet the requirement of the processing method using the varied echo time CPMG scheme. The measurement can be described as $$90_x°-[\tau_n-180_y°-\tau_n-\text{echo}-\tau_n-180_x°-\tau_n-\text{echo}]_n, \tag{15}$$

where $\tau_n$ would be incremented after every even echo. For a steady flow, the net phase accumulation $\phi_{odd}$ of odd echoes in this measurement can be expressed as $$\phi_{odd}=\gamma G v_{avg}\tau_n^2. \tag{16}$$

A detailed derivation is given in the Appendix A section of this specification. It can be seen from Eq. (16) that the $\phi_{odd}$ depends on G, $v_{avg}$ and $\tau_n$. One measurement of the varied echo time CPMG scheme provides the $\phi_{odd}$ at the different $\tau_n^2$, which can be employed to determine the $v_{avg}$ by fitting.

Magnitude-Based Method

Under laminar flow conditions, the flow velocity profile is a distribution of velocities, which results in a distribution of accumulated phases at the odd echoes, leading to a change in signal magnitude. Employing odd echo magnitudes is therefore a workable strategy to determine some flow parameters. Assuming complete polarization, the odd echo magnitude $M_{odd}$ detected with a flow-directed gradient can be expressed as $$M_{odd}=M_0 M_R M_\phi, \tag{17}$$

where $M_0$ is the equilibrium magnetization value, which depends on the detected fluid type and quantity. $M_R$ is the normalized magnitude caused by the decay of $T_2$ relaxation, which depends on the detected fluid relaxation property. $M_\phi$ is the normalized magnitude resulting from the phase accumulation, related to the velocity distribution. $M_0$ and $M_R$ are independent of the flow, and thus $M_\phi$ can be obtained from dividing the acquired magnitude for stationary solution by the acquired magnitude with flow with the same acquisition parameters.

The normalized signal $S_\phi$ of all odd echoes due to the phase accumulation is the same, which can be expressed as $$S_\phi = \frac{\int\int \exp(-i\phi_{odd})rdrd\theta}{\int\int ds} = \frac{\int\cos(\phi_{odd})rdr}{\int rdr} - i\frac{\int\sin(\phi_{odd})rdr}{\int rdr}, \quad (18)$$

where i is the imaginary unit, and ds=rdrd$\theta$ is differential of cross-sectional area. From Eq. (18), the normalized real signal $$S_{Re} = \frac{\int\cos(\phi_{odd})rdr}{\int rdr}$$

and the normalized imaginary signal $$S_{Im} = -\frac{\int\sin(\phi_{odd})rdr}{\int rdr}$$

due to the phase accumulation for all odd echoes. For a circular pipe with a radius of R, they can be modified as $$S_{Re} = \frac{\int_0^R \cos(\phi_{odd})rdr}{\int_0^R rdr} = \quad (19)$$

$$\frac{\int_0^R \cos\left(X\left(1 - \frac{r^m}{R^m}\right)\right)rdr}{\int_0^R rdr} = \frac{e^{Xi}(-i)^{-\frac{2}{m}}\left(\Gamma\left(\frac{2}{m}\right) - \Gamma\left(\frac{2}{m}, Xi\right)\right) + e^{-Xi}i^{-\frac{2}{m}}\left(\Gamma\left(\frac{2}{m}\right) - \Gamma\left(\frac{2}{m}, -Xi\right)\right)}{mX^{\frac{2}{m}}},$$

and $$S_{Im} = -\frac{\int_0^R \sin(\phi_{odd})rdr}{\int_0^R rdr} = \quad (20)$$

$$-\frac{\int_0^R \sin\left(X\left(1 - \frac{r^m}{R^m}\right)\right)rdr}{\int_0^R rdr} = i\frac{e^{Xi}(-i)^{-\frac{2}{m}}\left(\Gamma\left(\frac{2}{m}\right) - \Gamma\left(\frac{2}{m}, Xi\right)\right) - e^{-Xi}i^{-\frac{2}{m}}\left(\Gamma\left(\frac{2}{m}\right) - \Gamma\left(\frac{2}{m}, -Xi\right)\right)}{mX^{\frac{2}{m}}},$$

where $$X = \frac{m+2}{m}\gamma G v_{avg}\tau^2$$

and $\Gamma(a, x)=\int_x^\infty w^{a-1}e^{-w}dw$. The normalized magnitude $M_\phi$ of odd echoes due to the phase accumulation can be calculated from $$M_\phi = \sqrt{(S_{Re})^2 + (S_{Im})^2} = \quad (21)$$

$$\frac{2}{mX^{\frac{2}{m}}}\sqrt{\left(\Gamma\left(\frac{2}{m}\right) - \Gamma\left(\frac{2}{m}, -Xi\right)\right)\left(\Gamma\left(\frac{2}{m}\right) - \Gamma\left(\frac{2}{m}, -Xi\right)\right)}.$$

It can be seen from Eq. (21) that $M_\phi$ is not only related to instrument and acquisition parameters, G and $\tau$, but also to laminar flow parameters, m and $v_{avg}$. Based on Eqs. (14) and (21), we present some schemes for determining the laminar flow parameters, as follow:

Scheme 1: We just use one odd echo to calculate laminar flow parameters. The $v_{avg}$ is determined from the echo net phase accumulation using Eq. (14), and then m is solved by Eq. (21) with the calculated $v_{avg}$. This scheme, only involving one odd echo data may suffer from noise, and thus the results may have a poor reliability for realistic flow measurements.

Scheme 2: Based on the magnitude data of odd echoes at different $\tau$, the $v_{avg}$ and m are directly fitted by Eq. (21). Due to the complexity of Eq. (21), insufficient data detected might affect the fitting accuracy for this scheme.

Scheme 3: Based on the net phase accumulation of odd echoes at different $\tau$, the $v_{avg}$ is fitted by Eq. (14). Subsequently, the m is fitted by Eq. (21) based on the magnitude data of odd echoes and the fitted $v_{avg}$.

Schemes 1-3 all employ odd echo signals detected with CPMG measurement with a flow-directed constant G, to solve for the laminar flow parameters, m and $v_{avg}$. In another embodiment, it would be feasible to use $v_{avg}$ determined from a known volumetric flow rate and pipe diameter as an alternative to the $v_{avg}$ determined by the net phase accumulation of odd echoes in Schemes 1 and 3.

Velocity Spectrum Method

The complex signal S(q) of all odd echoes in a CPMG measurement after removing diffusion effect can be expressed as [16, 45]

$$S(q) = \int_{-\infty}^{+\infty} p(v)\exp(-iqv)dv, \quad (22)$$

where q=$\gamma G\tau^2$, and p(v) is the velocity spectrum. Eq. (22) shows that S(q) is the Fourier transform of p(v) with respect to v. p(v) can therefore be determined by the inverse Fourier transform of S(q) with respect to q, described as $$p(v) = \int_{-\infty}^{+\infty} S(q)\exp(-iqv)dq. \quad (23)$$

For an acquisition system with a constant magnetic field gradient, one can only change $\tau$ during the measurement. Note that this method does not involve the use of phase-, frequency-, and motion-encoding magnetic resonance gradients. When the magnetic field gradient is parallel to the flow direction, q is a positive number, and thus Eq. (23) can be modified as $$p(v) = \int_0^{+\infty} S(q)\exp(-iqv)dq. \quad (24)$$

To meet the uniform sample of q, $\tau^2$ is increased with a constant step size. The Field of Flow (FOF) is determined by $2\pi/\Delta q$, where $\Delta q = \gamma G \Delta(\tau^2)$ is the step size of q. Since FOF should be no less than the maximum velocity of flow, a short step size of $\tau^2$ is required. To obtain a velocity spectrum with an adequate resolution, a large step size of $\tau^2$ is recommended. To have a combined consideration, a compromise step size of $\tau^2$ should be recommended for each measurement. When the velocities are more than the maximum velocity of flow, their amplitudes should be zero in the velocity spectrum. One can therefore determine the maximum velocity based on the break point in the velocity spectrum. Combined with the average velocity from the net phase accumulation of odd echoes or volumetric flow rate and pipe diameter, m can be solved with a known maximum velocity.

For a Poiseuille flow, one can directly use the velocity spectrum to calculate the flow profile by [15, 16]

$$r^2(v) = R^2\left[1 - \int_{v_{min}}^{v} p(v)dv\right], \tag{25}$$

where r(v) is the radial position associated with a flow velocity, and $v_{min}$ is the minimum velocity at r=R.

Numerical Simulations and Analyses

To assess methods according to some embodiments of the present invention for determining the flow parameters in circular pipe, a few numerical simulation tests were performed. Owing to the use of the normalized data during the whole simulations, we can replace the simulations on the whole circular pipe from those on a circular cross-section. The cross-section was discretized using a 500×500 grid, and a diagram of discretized cross-section via a 10×10 grid was shown in FIG. 5. We note larger grid (>$500^2$) did not show appreciable changes for the normalized signal simulated. The intersections on the grid in the circular cross-section were considered during the simulations. The velocity of each intersection can be calculated based on the flow velocity profile (Eq. 9). The normalized real and imaginary signal due to a phase accumulation, for odd echoes during CPMG measurement, can be written by discrete form $$S_{Re} = \frac{1}{N}\sum_{i=1}^{N}\cos(\gamma G v_i \tau^2), \tag{26}$$

and $$S_{Im} = -\frac{1}{N}\sum_{i=1}^{N}\sin(\gamma G v_i \tau^2), \tag{27}$$

where N is the number of intersections in the circular cross-section, and $v_i$ is the velocity at the ith intersection. Therefore, the net phase accumulation $\phi_{odd}$ of odd echoes can be calculated by $$\phi_{odd} = \arctan\left(-\frac{S_{Im}}{S_{Re}}\right) = \arctan\left[\frac{\sum_{i=1}^{N}\sin(\gamma G v_i \tau^2)}{\sum_{i=1}^{N}\cos(\gamma G v_i \tau^2)}\right]. \tag{28}$$

The normalized magnitude $M_\phi$ of odd echoes due to the phase accumulation can be determined from $$M_\phi = \sqrt{(S_{Re})^2 + (S_{Im})^2} = \frac{1}{N}\sqrt{\left[\sum_{i=1}^{N}\cos(\gamma G v_i \tau^2)\right]^2 + \left[\sum_{i=1}^{N}\sin(\gamma G v_i \tau^2)\right]^2}. \tag{29}$$

The radius of the cross-section was set to 1 cm and the magnetic field gradient was set to 65 gauss/cm during the simulations. To match the experimental data, Gaussian noises with a SNR of 50 were added to the real and imaginary signal. We verified the effectiveness of the three type methods in Section 2.3 to determine the laminar flow parameters via processing the simulated data, as follow.

Figure 5:
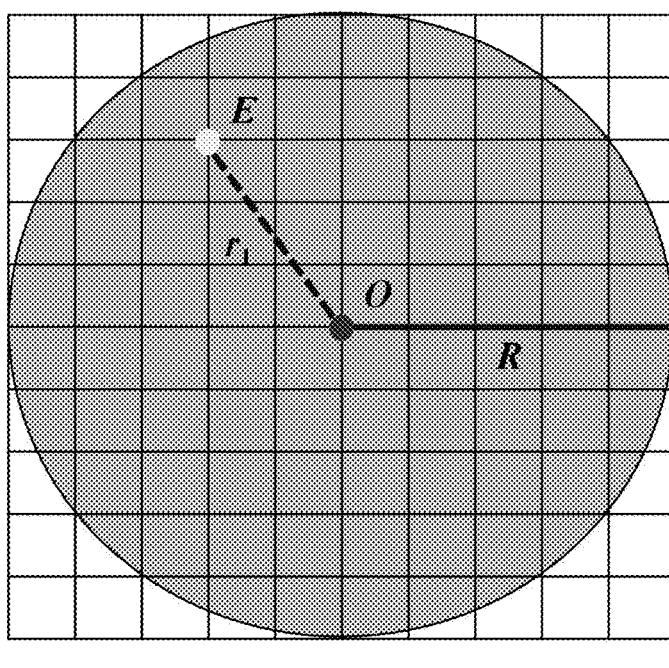
FIG. 5 is a diagram of discretized cross-section via a 10×10 grid.

FIG. 5 is a diagram of discretized cross-section via a 10×10 grid. It was assumed all fluids were positioned on the intersections of the grid in the circular cross-section, and there is nothing inside a single grid. The flow velocity can be calculated on each intersection, for example, $$v_E = \frac{m+2}{m}v_{avg}\left(1 - \frac{r_1^m}{R^m}\right)$$

at the intersection E, where $r_1$ is the distance of the intersection E from the centre O.

Phase-Based Method Verification

The normalized real and imaginary signals of odd echoes for the three type of laminar flows shown in FIG. 4, at seven different T ranging from 100 to 400 μs with a step size of 50 μs, were calculated based on Eqs. (26)-(27). After adding noise, the net phase accumulations can be determined by Eq. (28). FIGS. 6(a-c) showed the relation of the net phase accumulation $\phi_{odd}$ of odd echoes to $\tau^2$ for the laminar flows, where $\phi_{odd}$ were the mean of 10 separate simulations and error bars were determined by their standard deviations. From FIGS. 6(a-c), we can see that the net phase accumulation of odd echoes, at the same $v_{avg}$, are very close, independent of the flow type.

The simulated data were fitted employing Eq. (13), and the $v_{avg}$ were determined to be 5.01±0.01, 4.94±0.02, and 5.04±0.02 cm/s for Poiseuille flow, shear-thickening flow, and shear-thinning flow, respectively, which are similar to the model $v_{avg}$=5 cm/s, within 1%. These indicated that the net phase accumulation of odd echoes can be used to determine the average velocity of any type of laminar flow.

Figure 6A:
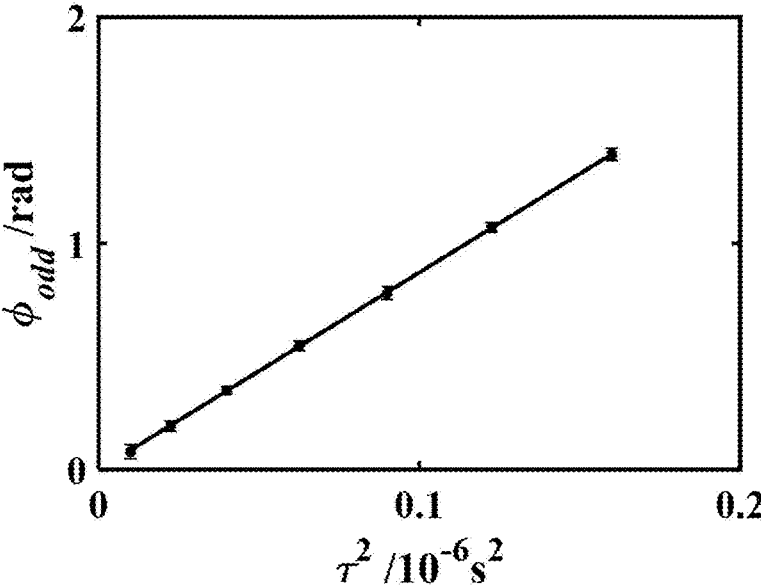
FIG. 6(a) is a graph of fitted results of $\phi_{odd}$ for Poiseuille flow.
Figure 6B:
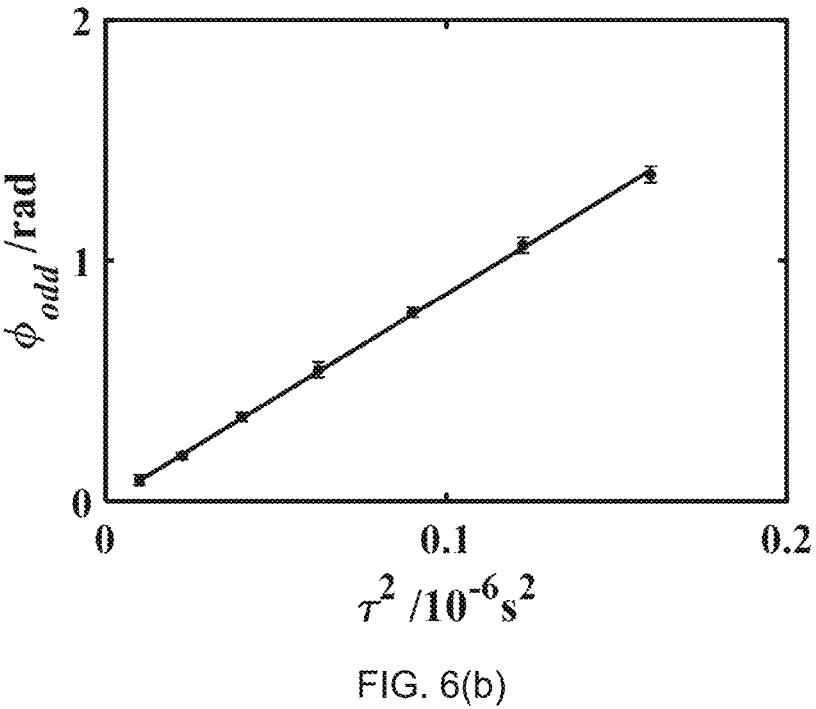
FIG. 6(b) is a graph of fitted results of $\phi_{odd}$ for shear-thickening flow (FIG. 6(a))
Figure 6C:
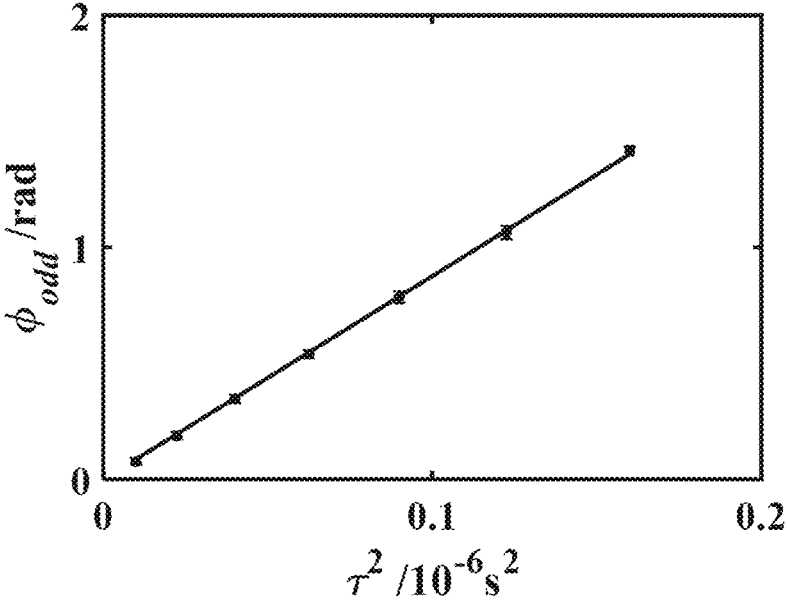
FIG. 6(c) is a graph of fitted results of $\phi_{odd}$ for shear-thinning flow.

FIG. 6(a), FIG. 6(b) and FIG. 6(c) are graphs of fitted results of $\phi_{odd}$ at different $\tau^2$: for Poiseuille flow (FIG. 6(a)), shear-thickening flow (FIG. 6(b)), and shear-thinning flow (FIG. 6(c)). The fitted relationships between $\phi_{odd}$ and $\tau^2$ were $\phi_{odd}$=(5.01±0.01)$\gamma G \tau^2$ for FIG. 6(a), $\phi_{odd}$=(4.94±0.02) $\gamma G \tau^2$ for FIG. 6(b), and $\phi_{odd}$=(5.04±0.02)$\gamma G \tau^2$ for FIG. 6(c).

Magnitude-Based Method Verification

Figure 7A:
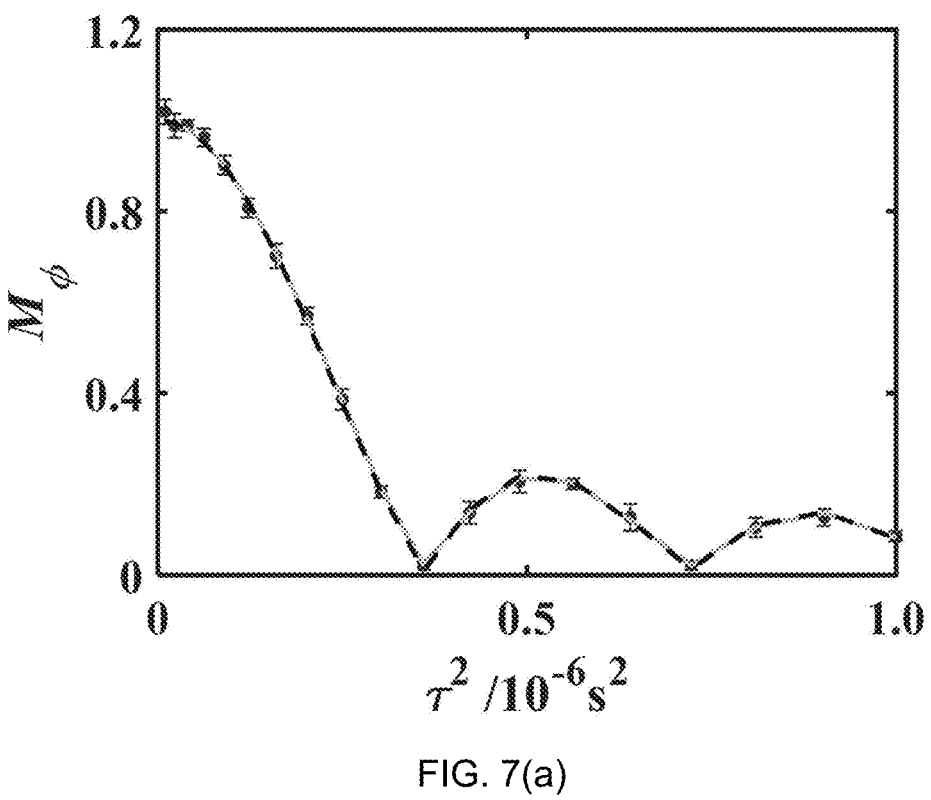
FIG. 7(a) are fitted results of $M_\phi$ using scheme 2 and scheme 3 according to aspects of the present disclosure for Poiseuille flow.
Figure 7B:
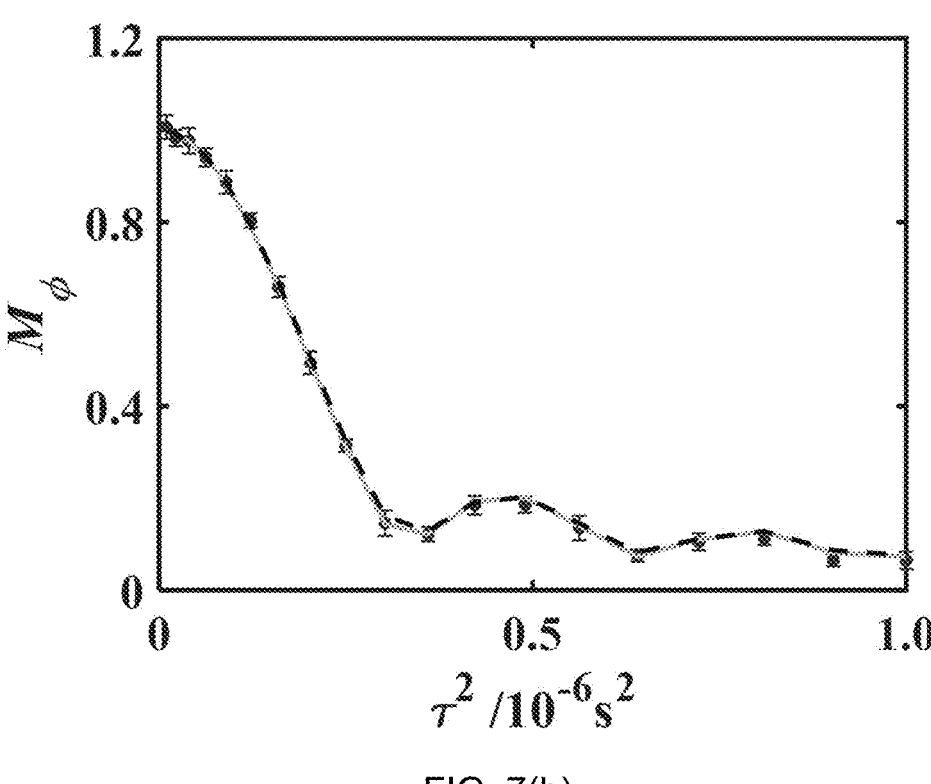
FIG. 7(b) are fitted results of $M_\phi$ using scheme 2 and scheme 3 according to aspects of the present disclosure for shear-thickening flow.
Figure 7C:
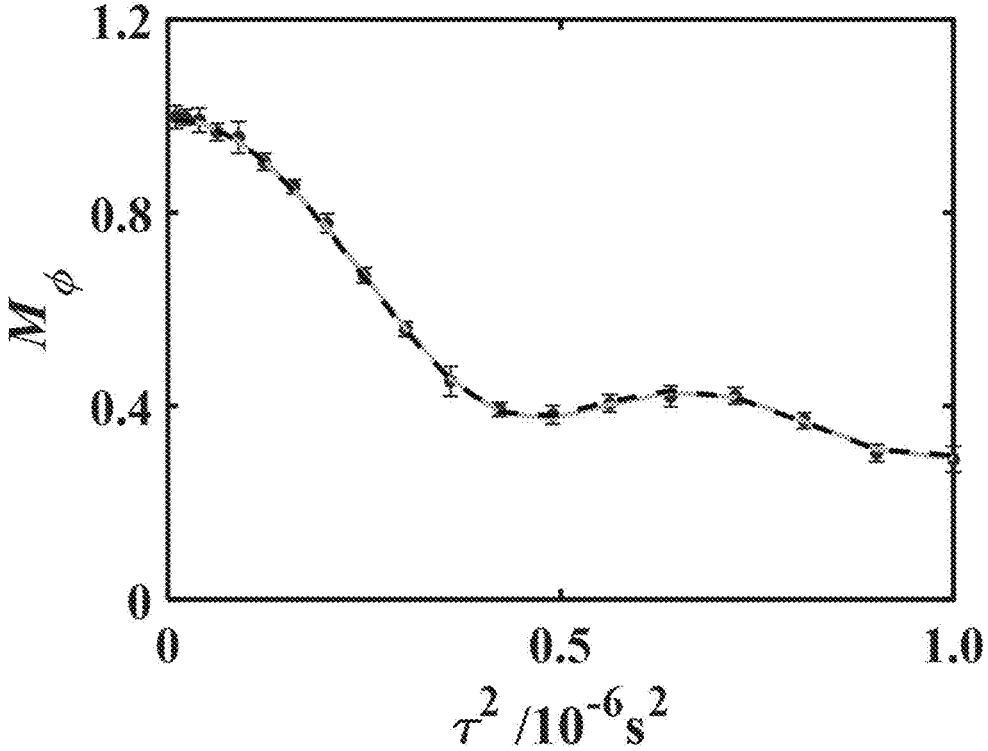
FIG. 7(c) are fitted results of $M_\phi$ using scheme 2 and scheme 3 according to aspects of the present disclosure for shear-thinning flow.

To ensure the accuracy of the magnitude-based method, it is desirable to employ more magnitude data of odd echoes. Here the normalized magnitudes $M_\phi$ of odd echoes due to phase accumulation at 19 different $\tau$ ranging from 100 to 1000 μs with a step size of 50 μs were employed. FIGS. 7(a-c) showed the relation of $M_\phi$ to $\tau^2$ for the laminar flows, where $M_\phi$ are the mean of 10 separate simulations and error bars are determined by their standard deviations. The trends of $M_\phi$ significantly differ with the type of laminar flows at the same $v_{avg}$. The schemes 2 and 3 were both employed to process the simulated magnitude data to obtain the laminar flow parameters. For scheme 3, the fitted $v_{avg}$ from the phase-based method in Section 3.1 was used. The fitted results of the two schemes are shown in FIGS. 7(*a-c*).

For the Poiseuille flow, m=1.92±0.03 and $v_{avg}$=4.93±0.06 by the scheme 2, and m=1.98±0.02 by the scheme 3. For the shear-thickening flow, m=1.54±0.03 and $v_{avg}$=5.05±0.10 by the scheme 2, and m=1.48±0.02 by the scheme 3. For the shear-thinning flow, m=4.99±0.03 and $v_{avg}$=4.97±0.03 by the scheme 2, and m=5.04±0.03 by the scheme 3. The fitted m and $v_{avg}$ by the scheme 2 agree with the model, within 4% and 1%, similarly, the fitted m by the scheme 3 are close to the model, within 1%, for three type of laminar flows. The fitted results indicated that the schemes 2 and 3 can both be used to determine the laminar flow parameters by processing the normalized magnitude of odd echoes during CPMG measurement with a flow-directed gradient. The error of the fitted m by scheme 3 is slightly lower than those by scheme 2, due to less output parameters of scheme 3, revealing that scheme 3 is a bit superior to scheme 2.

Figures 8A, 8B:
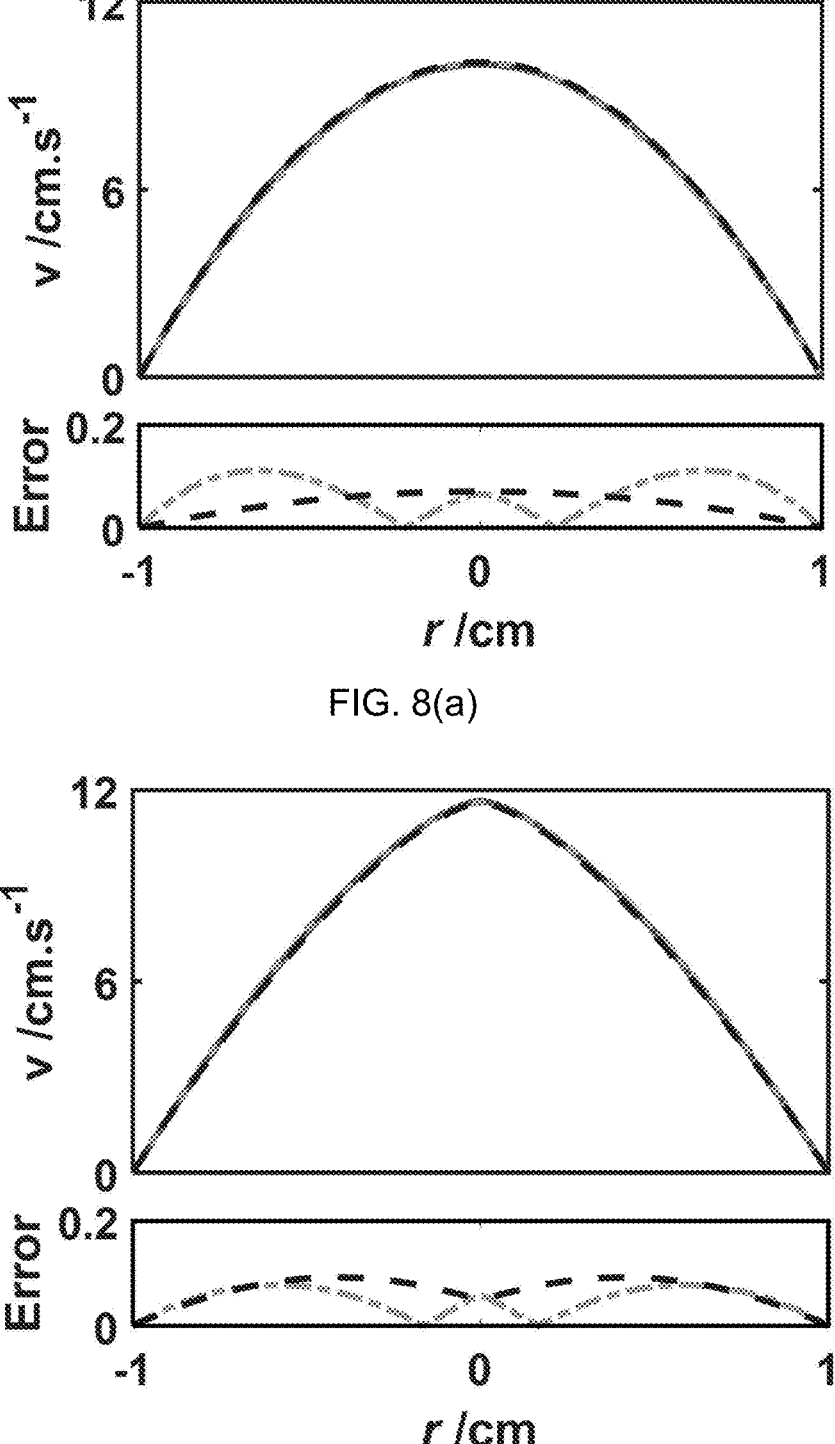
FIG. 8(a) is a comparison of a 1D flow velocity profile model with those reconstructed by scheme 2 and scheme 3 according to aspects of the present disclosure for Poiseuille flow.
FIG. 8(b) is a comparison of a 1D flow velocity profile model with those reconstructed by scheme 2 and scheme 3 according to aspects of the present disclosure for shear-thickening flow.
Figure 8C:
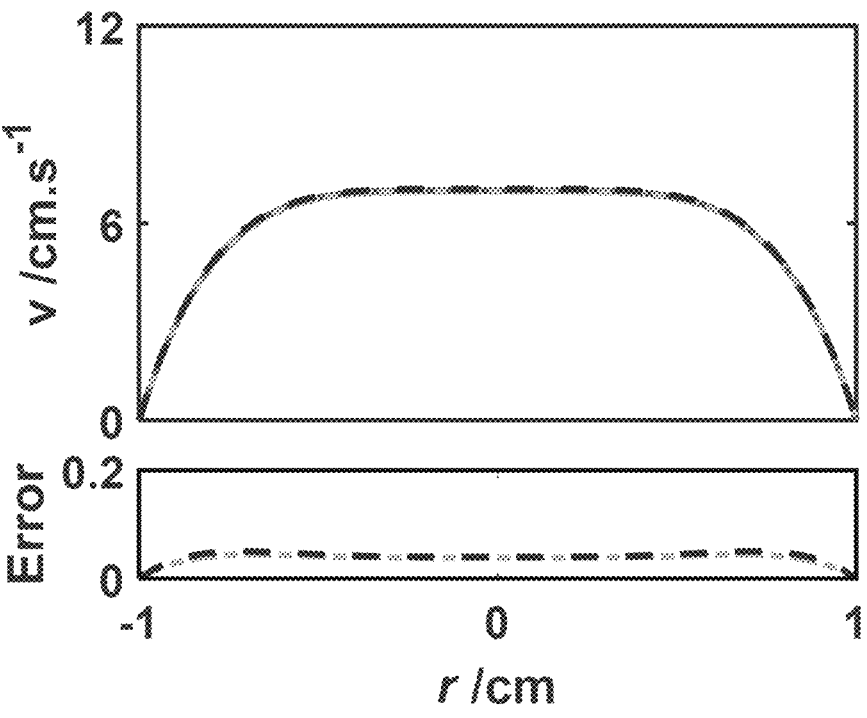
FIG. 8(c) is a comparison of a 1D flow velocity profile model with those reconstructed by scheme 2 and scheme 3 according to aspects of the present disclosure for shear-thinning flow.

Based on the fitted flow parameters by schemes 2 and 3, the flow velocity profiles were reconstructed and then compared with the model, as shown in FIGS. 8(*a-c*). From FIGS. 8(*a-c*), we can see that the reconstructed 1D flow velocity profiles for the three laminar flows are very close to the model. The error plots exhibited that the velocity errors in the pipe are less than 0.2 cm/s, revealing the effectiveness of the magnitude-based method to determine the flow parameters.

FIG. 7(*a*), FIG. 7(*b*) and FIG. 7(*c*) are fitted results of $M_\phi$ at different $\tau^2$ using scheme 2 (—) and scheme 3 (—) for Poiseuille flow (FIG. 7(*a*)), shear-thickening flow (FIG. 7(*b*)), and shear-thinning flow (FIG. 7(*c*)). All the $M_\phi$ for different laminar flows decreases with oscillations as $\tau^2$ increases. The trends of $M_\phi$ significantly differ with the type of laminar flows at the same $v_{avg}$. The fitted curves by schemes 2 and 3 are both in agreement with the simulated data.

FIG. 8(*a*), FIG. 8(*b*) and FIG. 8(*c*) are comparisons of 1D flow velocity profile models (—) with those reconstructed by scheme 2 (—) and scheme 3 (—) for Poiseuille flow (FIG. 8(*a*)), shear-thickening flow (FIG. 8(*b*)), and shear-thinning flow (FIG. 8(*c*)). The bottom subplots represent the absolute error between the reconstructed profile and model, displaying that the velocity errors for any laminar flows in the pipe are less than 0.2 cm/s.

Velocity Spectrum Method Verification

To meet the requirement of the velocity spectrum method, the data must be sampled with a fixed increment of $\tau^2$. During the simulations, the normalized signals at 128 different $\tau^2$ ranging from $6.25\times10^{-4}$ to 31.75 ms$^2$ with a step size of 0.25 ms$^2$, for the three flows, were calculated and then added Gaussian noises. The FOF was therefore 14.45 cm/s. Before undertaking Fourier transformation of simulated data, the exponential filtering method was employed to improve the resolution of velocity spectrum. The velocity spectrums for Poiseuille flow, shear-thickening flow, and shear-thinning flow were shown in FIG. 9(*a*), FIG. 9(*b*) and FIG. 9(*c*).

Figure 9A:
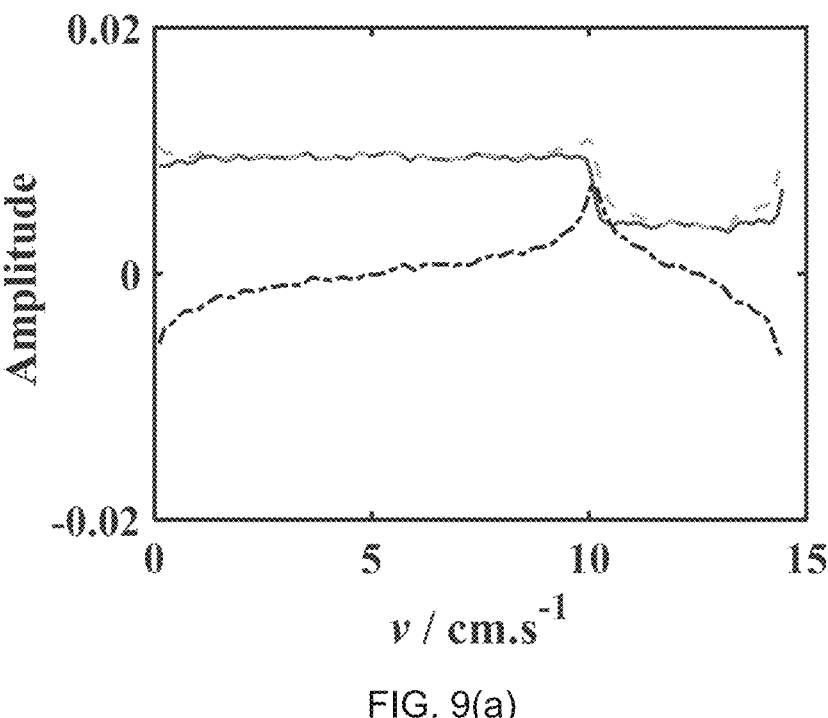
FIG. 9(a) are real, imaginary, and magnitude velocity spectrums obtained by Fourier transformation of the simulated signals of odd echoes for Poiseuille flow.
Figure 9B:
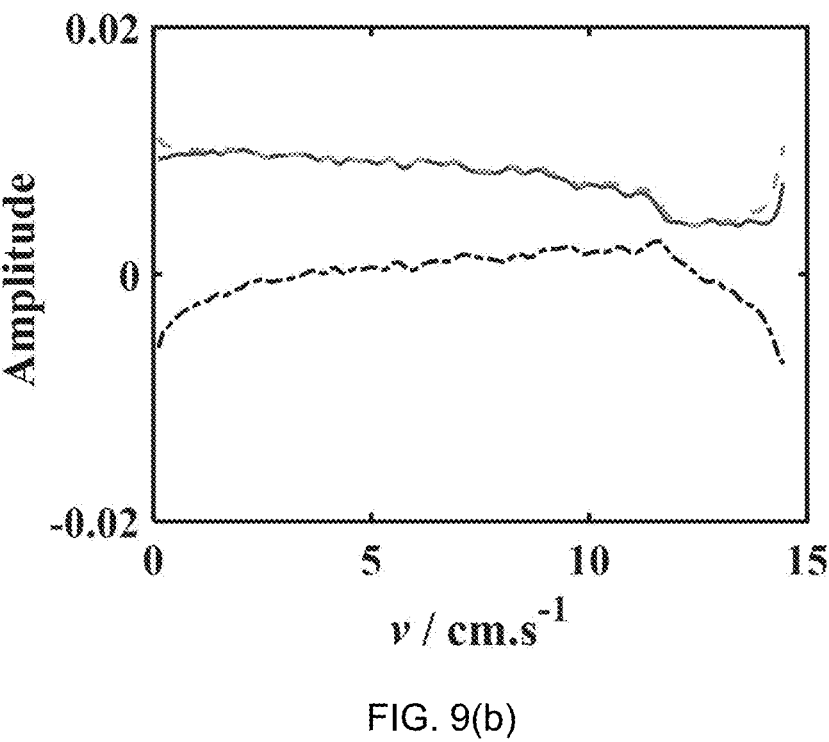
FIG. 9(b) are real, imaginary, and magnitude velocity spectrums obtained by Fourier transformation of the simulated signals of odd echoes for shear-thickening flow.
Figure 9C:
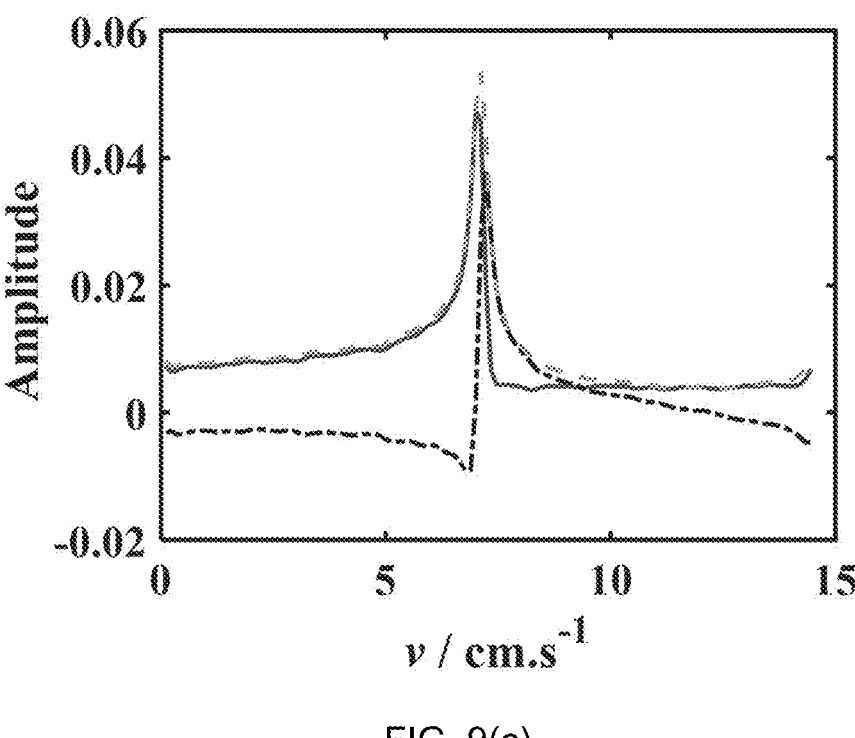
FIG. 9(c) are real, imaginary, and magnitude velocity spectrums obtained by Fourier transformation of the simulated signals of odd echoes for shear-thinning flow.

FIG. 9(*a*), FIG. 9(*b*) and FIG. 9(*c*) are real (—), imaginary (—), and magnitude (—) velocity spectrums obtained by Fourier transformation of the simulated signals of odd echoes for Poiseuille flow (FIG. 9(*a*)), shear-thickening flow (FIG. 9(*b*)), and shear-thinning flow (FIG. 9(*c*)). Based on the break point at the velocity spectrums, the maximum velocities of the three flows were 10.05±0.11, 11.63±0.11, and 7.11±0.11, respectively.

It can be seen from FIG. 9(*a*), FIG. 9(*b*) and FIG. 9(*c*) that the characteristics of the velocity spectrum vary from the laminar flow type. Based on their characteristics, the flow type can be identified qualitatively. More importantly, the $v_{max}$ of the laminar flows can be determined from the break point at the velocity spectrums. The $v_{max}$ of the three flows were 10.05±0.11, 11.63±0.11, and 7.11±0.11, respectively. Combined with their $v_{avg}$ from net phase accumulation in the Phase-based method described above, their m were determined to be 1.99, 1.48, and 4.87, respectively, by Eq. (10). Their calculated m values are similar to the models, within 3%.

Figure 10:
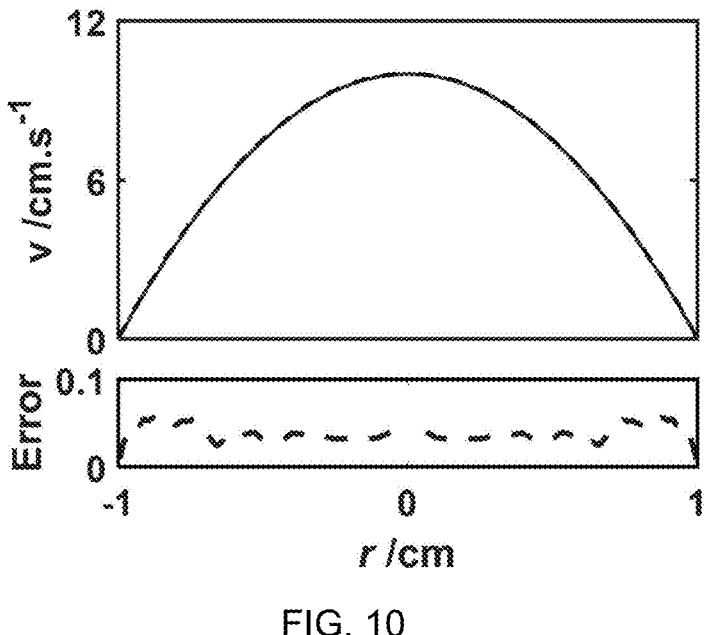
FIG. 10 is a comparison graph of Poiseuille flow velocity profile model with that reconstructed by the velocity spectrum.
Figure 11A:
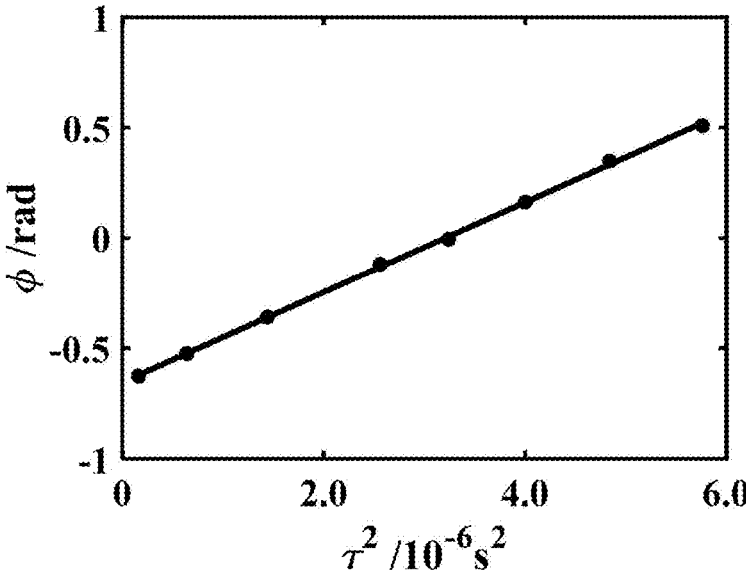
FIG. 11(a) is a graph of processed results of the phase-based method for glycerol/distilled water flows at $v_{avg}=1.89\pm0.05$ cm/s.
Figure 11B:
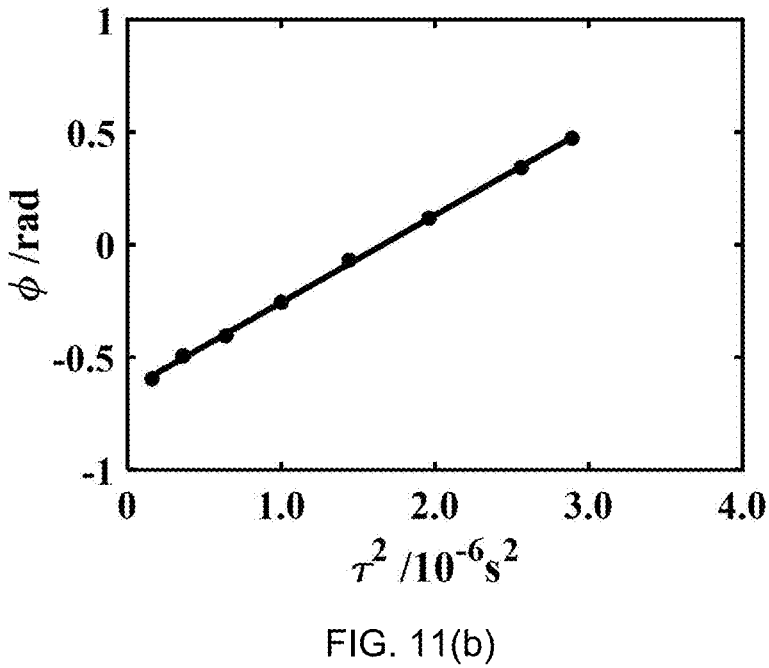
FIG. 11(b) is a graph processed results of the phase-based method for glycerol/distilled water flows at $v_{avg}=3.69\pm0.05$ cm/s.
Figure 11C:
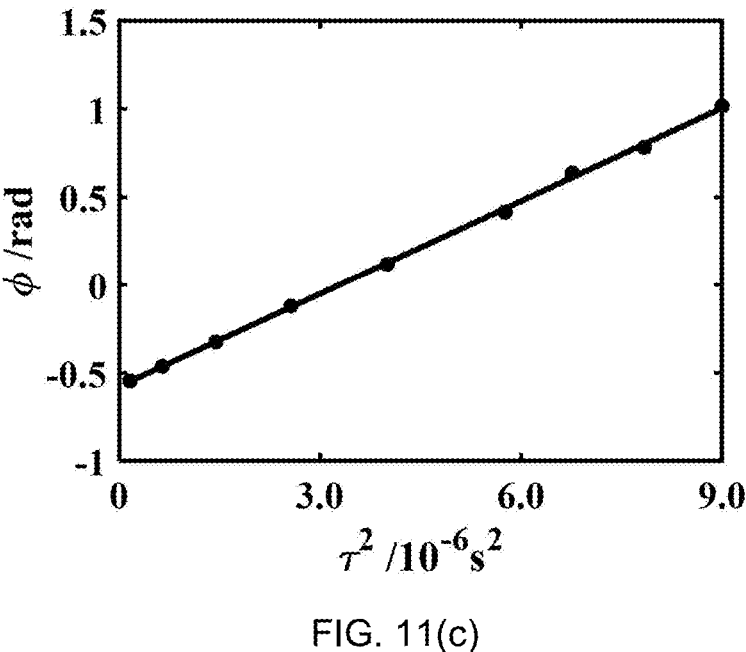
FIG. 11(c) is a graph processed results of the phase-based method for xanthan gum solution flows at $v_{avg}=1.65\pm0.05$ cm/s.
Figure 11D:
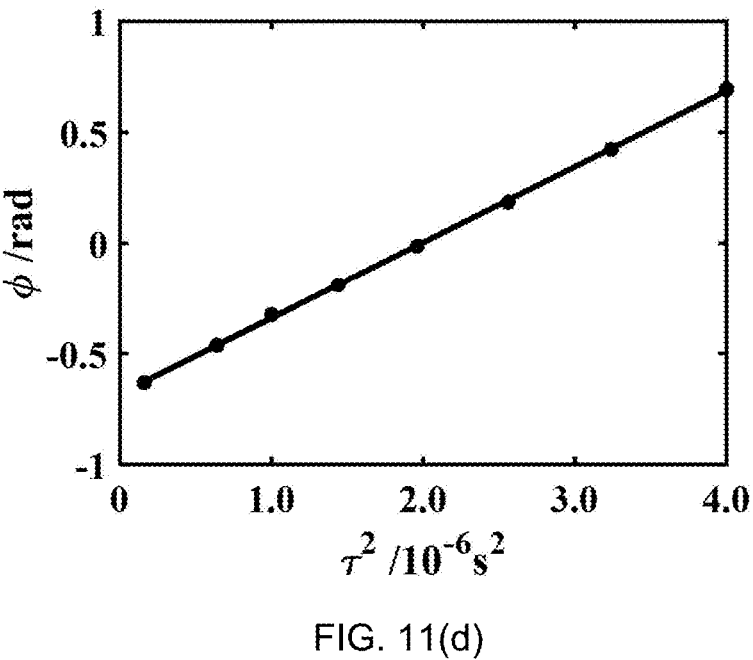
FIG. 11(d) is a graph processed results of the phase-based method for xanthan gum solution flows at $v_{avg}=3.12\pm0.05$ cm/s.
Figure 12A:
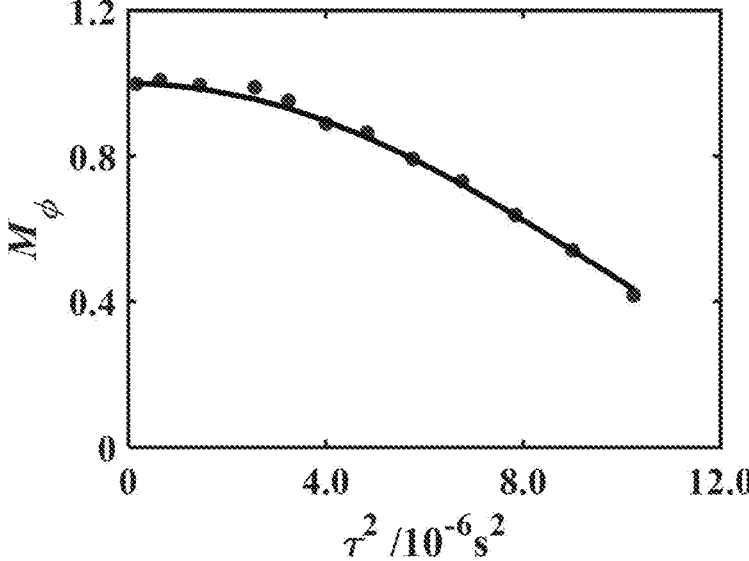
FIG. 12(a) is a graph of fitted $M_\phi$ of flow with respect to $\tau^2$ using the magnitude-based method (scheme 3) according to an aspect of the present disclosure for the glycerol/distilled water flows at $v_{avg}=1.89\pm0.05$ cm/s.
Figure 12B:
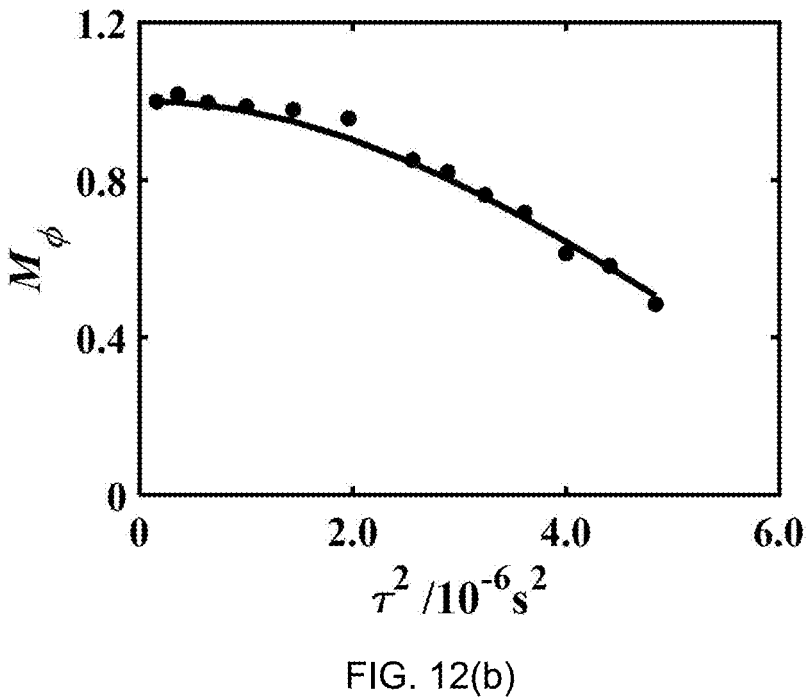
FIG. 12(b) is a graph of fitted $M_\phi$ of flow with respect to $\tau^2$ using the magnitude-based method (scheme 3) according to an aspect of the present disclosure for the glycerol/distilled water flows at $v_{avg}=3.69\pm0.05$ cm/s.
Figure 12C:
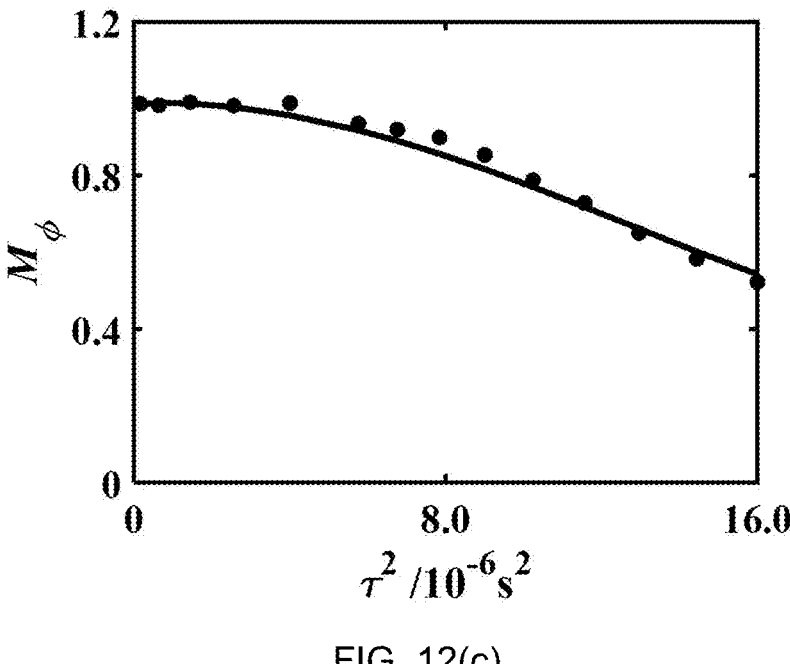
FIG. 12(c) is a graph of fitted $M_\phi$ of flow with respect to $\tau^2$ using the magnitude-based method (scheme 3) according to an aspect of the present disclosure for xanthan gum solution flows at $v_{avg}=1.65\pm0.05$ cm/s.
Figure 12D:
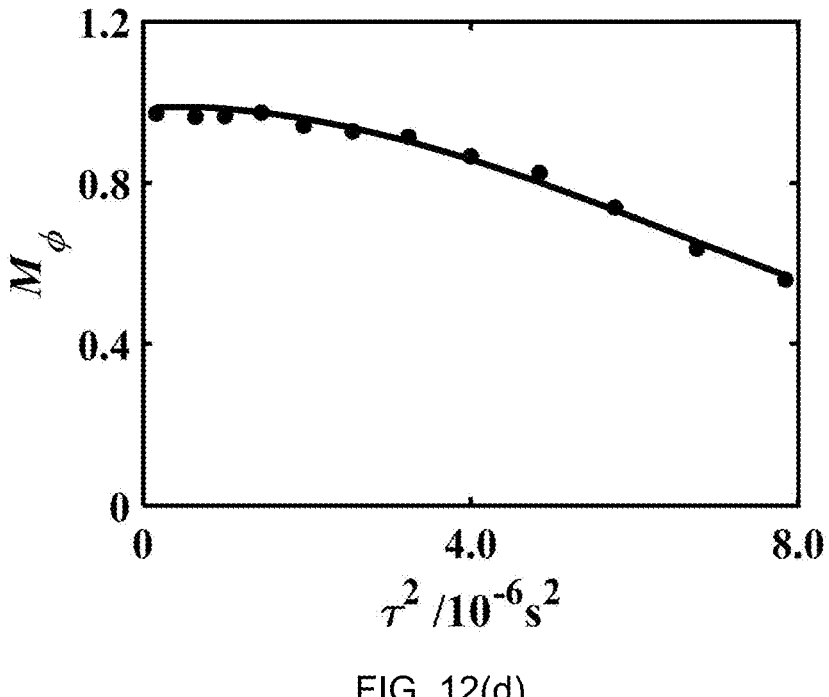
FIG. 12(d) is a graph of fitted $M_\phi$ of flow with respect to $\tau^2$ using the magnitude-based method (scheme 3) according to an aspect of the present disclosure for xanthan gum solution flows at $v_{avg}=3.12\pm0.05$ cm/s.

For Poiseuille flow, the 1D flow velocity profile was reconstructed by Eq. (25) based on the real velocity spectrum, as shown in FIG. 10. The reconstructed velocity profile coincides with the model, and the absolute error is no more than 0.1 cm/s, which verifies the feasibility of the velocity spectrum method to reconstruct Poiseuille flow profile.

FIG. 10 is a comparison of Poiseuille flow velocity profile model (—) with that reconstructed by the velocity spectrum (—). The bottom subplots represent the absolute error between the reconstructed profile and model, displaying that the velocity errors for the Poiseuille flow in the pipe are less than 0.1 cm/s.

Experiments

Two solutions, one Newtonian fluid and one shear-thinning fluid, were prepared for flow experiments. Distilled water and glycerol were mixed in a ratio of 6:1 to prepare the Newtonian fluid. Xanthan gum solution, one of shear-thinning fluid [18, 47], was prepared in concentration of 0.42 wt % using distilled water. Xanthan gum complete dissolution was achieved by stirring for 10 h using a low gear mixer (Mastercraft, Toronto, Canada). The two solutions were doped with 0.33 wt % $CuSO_4$ to reduce their $T_1$ lifetimes and ensure the measured fluid was completely polarized. $T_1$ lifetimes of the glycerol/distill water solution and the xanthan gum solution were 42 ms and 39 ms.

Glycerol/distilled water solution flow experiments were performed at flow rates of 40±1 mL/min and 78±1 mL/min to produce average velocities of 1.89±0.05 cm/s and 3.69±0.05 cm/s. Reynolds numbers were 82 and 160 for the two flows, and thus the flows are of laminar flow type. Xanthan gum solution flow experiments were performed at flow rates of 35±1 mL/min and 66±1 mL/min to produce average velocities of 1.65±0.05 cm/s and 3.12±0.05 cm/s. These are within the laminar flow regime which is typically observed for Reynolds numbers up to 2000 [48]. All the flow rates were determined from outflow with a measuring cylinder and timer.

The CPMG measurement was employed to measure the two types of flows. Echo CPMG measurement using a single echo time required approximately 2.5 min with a repetition time of 300 ms and 512 averages. The $90_x^{\circ}$ and $180_y^{\circ}$ pulse durations were both set to 3.2 μs by the quadrature echo method during the CPMG measurement [49]. The desired tip angle of each pulse was achieved by adjusting the RF amplitude. Before the flow experiments, measurements of tap water Poiseuille flow at a known average velocity were performed with different $\tau$. It is very close to the gradient determined with the experimental field data, which indicating the feasibility of the Proteus magnet for flow measurement.

The measured magnitude data of flow were divided by a corresponding data collected for a stationary solution with the same measurement parameters, to obtain the normalized magnitude $M_\phi$ of odd echoes due to phase accumulation. The phase and $M_\phi$ of the first odd echo were processed employing the phase-based method and the magnitude-based method discussed above with respect to Flow Parameter Determination from CPMG measurement, as follows.

Based on the experimental real and imaginary signals, phase accumulations of the first odd echo at different $\tau^2$, for the two types of flows, were calculated. The phase accumulations $\phi$ were plotted with respect to $\tau^2$, as shown in FIGS. 11($a$-$d$). Since the experimental data contain a system phase $\phi_0$, the phase accumulation $\phi$ of odd echoes can be written as $$\phi = \phi_0 + \phi_{odd} = \phi_0 + + \gamma G v_{avg} \tau^2. \qquad (30)$$

Based on Eq. (30), the phase accumulations $\phi$ were fitted for each flow by a linear fitting method, and the fitted results were shown as solid lines in FIGS. 11($a$-$d$). The fitted $\phi_0 = 0.65 \pm 0.01$ rad and $v_{avg} = 1.88 \pm 0.02$ cm/s for the Poiseuille flow at $v_{avg} = 1.89 \pm 0.05$ cm/s, $\phi_0 = -0.64 \pm 0.01$ rad and $v_{avg} = 3.57 \pm 0.04$ cm/s for the Poiseuille flow at $v_{avg} = 3.69 \pm 0.05$ cm/s, $\phi_0 = -0.58 \pm 0.01$ rad and $v_{avg} = 1.62 \pm 0.02$ cm/s for the shear-thinning flow at $v_{avg} = 1.65 \pm 0.05$ cm/s, and $\phi_0 = -0.68 \pm 0.01$ rad and $v_{avg} = 3.15 \pm 0.02$ cm/s for the shear-thinning flow at $v_{avg} = 3.12 \pm 0.05$ cm/s.

FIGS. 11($a$-$d$) shows that the fitted phase accumulation of the first odd echo agrees with the measured phase accumulation, indicating the reliability of the fitted parameters. The fitted $v_{avg}$ is similar to the actual $v_{avg}$ for each flow, within 3%. The processed results of experimental data reveal that the phase-based method is feasible and practical in determining the average velocity of laminar flow.

FIG. 11($a$), FIG. 11($b$), FIG. 11($c$) and FIG. 11($d$) are processed results of the phase-based method for the glycerol/distilled water flows at $v_{avg} = 1.89 \pm 0.05$ cm/s (FIG. 11($a$)) and 3.69±0.05 cm/s (FIG. 11($b$)) and for the xanthan gum solution flows at $v_{avg} = 1.65 \pm 0.05$ cm/s (FIG. 11($c$)) and 3.12±0.05 cm/s (FIG. 11($d$)). Symbols (') show the calculated phase accumulation data of the first odd echo, and the solid line shows the fitted results based on Eq. (30). The fitted $\phi_0 = -0.65 \pm 0.01$ rad and $v_{avg} = 1.88 \pm 0.02$ cm/s for FIG. 11($a$), $\phi_0 = -0.64 \pm 0.01$ rad and $v_{avg} = 3.57 \pm 0.04$ cm/s for FIG. 11($b$), $\phi_0 = -0.58 \pm 0.01$ rad and $v_{avg} = 1.62 \pm 0.02$ cm/s for FIG. 11($c$), and $\phi_0 = 0.68 \pm 0.01$ rad and $v_{avg} = 3.15 \pm 0.02$ cm/s for FIG. 11($d$).

The normalized magnitude $M_\phi$ of the first odd echo at different $\tau^2$, for the two types of flows, were displayed as red dots in FIGS. 12($a$-$c$). After the $v_{avg}$ was determined from the phase-based method, the scheme 3 was employed to process the experimental data to obtain their flow parameter m. The fitted $M_\phi$ of different flows with respect to $\tau^2$ are shown as solid lines in FIG. 12($a$), FIG. 12($b$), FIG. 12($c$) and FIG. 12($d$): processed results of the magnitude-based method (scheme 3) for the glycerol/distilled water flows at $v_{avg} = 1.89 \pm 0.05$ cm/s (FIG. 12($a$)) and 3.69±0.05 cm/s (FIG. 12($b$)), and for the xanthan gum solution flows at $v_{avg} = 1.65 \pm 0.05$ cm/s (FIG. 12($c$)) and 3.12±0.05 cm/s (FIG. 12($d$)). Symbols (') show the $M_\phi$ data of the first odd echo, and the solid line shows the fitted results based on Eq. (21). The fitted m=2.11±0.06 cm/s for (FIG. 12($a$)), m=1.97±0.09 cm/s for (FIG. 12($b$)), m=5.38±0.19 cm/s for (FIG. 12($c$)), and m=5.37±0.17 cm/s for (FIG. 12($d$)).

The fitted m=2.11±0.06 cm/s and 1.97±0.09 cm/s for the glycerol/distilled water flows at $v_{avg} = 1.89 \pm 0.05$ cm/s and $v_{avg} = 3.69 \pm 0.05$ cm/s. The fitted m=5.38±0.19 cm/s and m=5.37±0.17 cm/s for the xanthan gum solution flows at $v_{avg} = 1.65 \pm 0.05$ cm/s and 3.12±0.05 cm/s. A comparison of the fitted m for the glycerol/distilled water flows with theoretical m of Poiseuille flow shows that the fitted m is very close to the actual m, within 6%, which reveals the effectiveness and practicality of the scheme 3 for laminar flows. Fitted m both are more than 2.0 for the xanthan gum solution flow. It confirms that the flows are shear-thinning flows, which is accordant with the real condition. The flow behaviour index $\omega = 0.23$ was determined from the fitted m at two flow velocities for the xanthan gum solution flow. The calculated $\omega$ is very similar to that from Blythe et al. for the similar solution concentrations under laminar conditions, verifying the reliability of the scheme 3 for non-Newtonian flows.

Figure 13A:
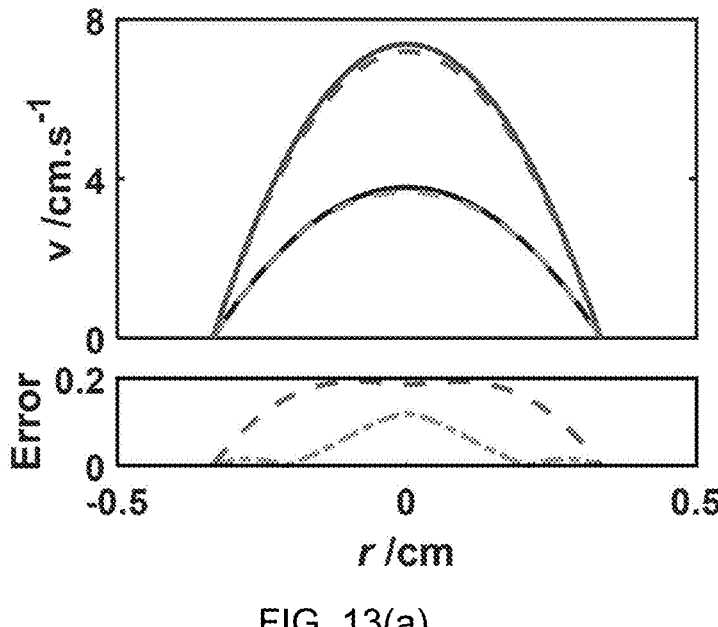
FIG. 13(a) is a plot of comparisons of 1D flow velocity profiles for the glycerol/distilled water flows from the magnitude-based method according to an aspect of the present disclosure.
Figure 13B:
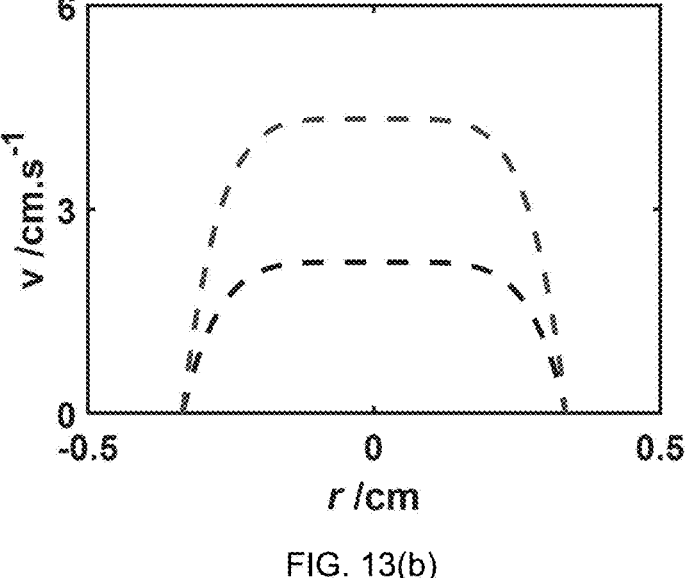
FIG. 13(b) is a plot of 1D flow velocity profiles for the xanthan gum solution flows based on the fitted m and $v_{avg}$.

Based on the fitted flow parameters m and $v_{avg}$ by the phase-based method and the magnitude-based method, their flow velocity profiles were reconstructed, as shown in FIG. 13($a$) and FIG. 13($b$). For Poiseuille flow, the flow velocity profiles can be predicted by flow rates due to known m=2.0. The theoretical predictions are shown as a solid line in FIG. 13($a$), where the bottom subplot represents the absolute error between the reconstructed profile and model. It shows that the velocity errors between reconstructed profiles and theoretical predictions in the pipe are less than 0.2 cm/s, which indicates the reliable precision of the phase-based method and the magnitude-based method.

FIG. 13($a$) is a plot of comparisons of 1D flow velocity profiles for the glycerol/distilled water flows from the magnitude-based method (dashed line) with the theoretical prediction (solid line), where the bottom subplot of FIG. 13($a$) represents the absolute error between the reconstructed profile and actual profile, displaying that the velocity errors between reconstructed profiles and theoretical predictions in the pipe are less than 0.2 cm/s. FIG. 13($b$) is a plot of 1D flow velocity profiles for the xanthan gum solution flows based on the fitted m and $v_{avg}$.

The Proteus magnet according to another embodiment of the present invention includes two pre-polarizing magnets 16 which may optionally be placed upstream from the two portable disk magnets 2. Pre-polarizing magnets 16 increase the time during which spins along the different streamlines in a flowing fluid polarize and thereby leads to higher polarization. In one embodiment, full polarization is achieved along all streamlines even with a long $T_1$ sample. The pre-polarizing magnets 16 may be selected from an array of permanent magnets or may be constructed based on a solenoidal electromagnet whose field strength is controlled by the current in the electromagnet. In another embodiment, one pre-polarizing magnet may be used and in a further embodiment, the pre-polarizing magnet may be an electro-magnet.

Sensors and methods according to some embodiments of the present invention may use any magnet assembly with a constant magnetic field gradient in the direction of flow for the measurements described in this specification.

In order to carry out methods according to embodiments of the present invention, a switched magnetic field gradient in a conventional MR/MRI instrument may be used. The switched gradient is turned on, with a stable value, and left on for the duration of an individual measurement, such as a CPMG measurement. The gradient is then switched off to control the gradient duty cycle to prevent over-heating. The process of switch on and stabilization is then repeated for signal averaging or alternate values of the measurement, for example change in the echo time.

Methods and devices according to some embodiments of the present invention permit determination of flow behaviour (rheology) of food materials, consumer products, polymers, pharmaceuticals and petroleum products.

APPENDIX A

A.1. Net Phase Accumulation of Odd Echoes for a CPMG Measurement

When the flow fluid is measured by CPMG MR method with a constant magnetic field gradient (G) in the direction of flow, the phase shift would occur. For a constant velocity v flow, the net phase accumulation $\phi$, related to time t, can be expressed as $$\phi = \gamma v \int G(t) t\, dt = \gamma v G \int t\, dt. \tag{A.1}$$

The phase at the $180_y{}^\circ$ pulse will be reversed during the measurement. The net phase accumulation of the first odd echo can therefore be calculated from $$\phi_1 = \gamma Gv \int_0^\tau t\, dt + \gamma Gv \int_\tau^{2\tau} t\, dt = \gamma Gv\tau^2, \tag{A.2}$$

where $\tau$ is the interval between $90_x{}^\circ$ and $180_y{}^\circ$ pulses. Due to net phase accumulation cancellations of all even echoes [44], the net phase accumulation of the (n+1)th (n≥1) odd echo can be calculated by $$\phi_{n+1} = \phi_{even,n} - \gamma Gv \int_{4n\tau}^{(4n+1)\tau} t\, dt + \gamma Gv \int_{(4n+1)\tau}^{(4n+2)\tau} t\, dt \tag{A.3}$$

$$= \phi_{even,n} + \gamma Gv\tau^2$$

$$= \gamma Gv\tau^2,$$

where $\phi_{even,n} = 0$ is the net phase accumulation of the nth even echo and $4n\tau$ is the time of even echo. In summary, the net phase accumulations of all odd echoes, with a flow-directed magnetic field gradient, are the same and equal to $\gamma Gv\tau^2$.

Figure 14:
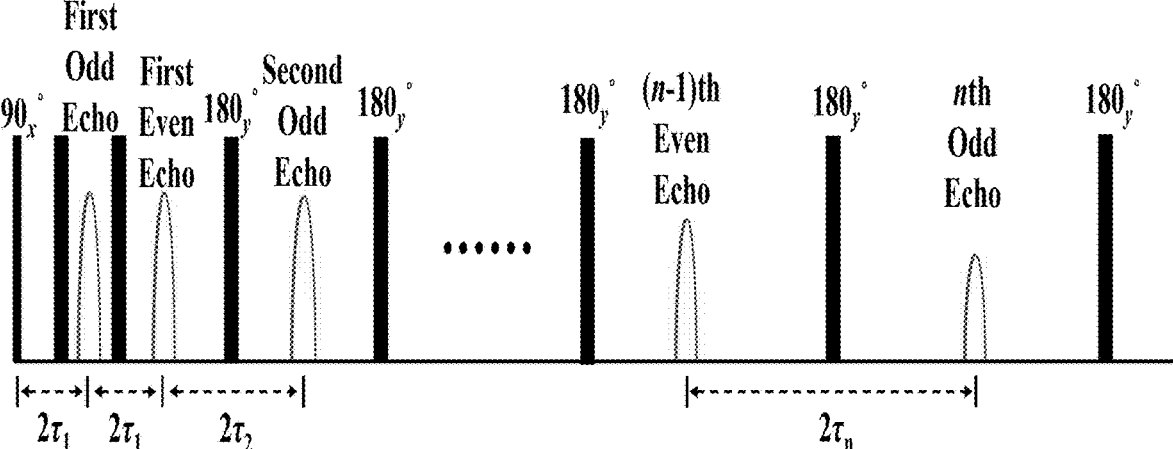
FIG. 14 is a diagram of a varied echo time CPMG scheme.

Net Phase Accumulation of Odd Echoes for a Varied Echo Time CPMG Measurement A diagram of the varied echo time CPMG was shown in FIG. 14. $\tau_n$ was increased after every even echo. Based on the derivations above, the net phase accumulation of the first odd echo with a flow-directed gradient, for a constant velocity v flow, is $\gamma Gv\tau_1{}^2$, and the net phase accumulation of the first even echo is zero.

The net phase accumulations of all even echoes are now shown as zero for a varied echo time CPMG measurement. Assuming the net phase accumulation of the nth (n≥1) even echo $\phi_{even,n}$ is zero, and then that of the (n+1)th even echo can be calculated by $$\phi_{even,n+1} = \phi_{even,n} + \gamma Gv \int_{T_n}^{T_n+\tau_{n+1}} t\, dt - \gamma Gv \int_{T_n+\tau_{n+1}}^{T_n+3\tau_{n+1}} t\, dt + \gamma Gv \int_{T_n+3\tau_{n+1}}^{T_n+4\tau_{n+1}} t\, dt \tag{A.4}$$

$$= \frac{1}{2}\gamma Gv\left(2T_n\tau_{n+1} + \tau_{n+1}^2\right) - \frac{1}{2}\gamma Gv\left(8T_n\tau_{n+1} + 4\tau_{n+1}^2\right) + \frac{1}{2}\gamma Gv\left(7T_n\tau_{n+1} + 2\tau_{n+1}^2\right)$$

$$= 0,$$

where $T_n$ is the time of the nth even echo. Therefore, the net phase accumulation cancels for all even echoes for a varied echo time CPMG measurement.

Similarly, the net phase accumulation of the (n+1)th (n≥1) odd echo can be calculated by $$\phi_{n+1} = \phi_{even,n} - \gamma Gv \int_{T_n}^{T_n+\tau_{n+1}} t\, dt + \gamma Gv \int_{T_n+\tau_{n+1}}^{T_n+2\tau_{n+1}} t\, dt \tag{A.5}$$

$$= 0 - \frac{1}{2}\gamma Gv\left(2T_n\tau_{n+1} + \tau_{n+1}^2\right) + \frac{1}{2}\gamma Gv\left(2T_n\tau_{n+1} + 3\tau_{n+1}^2\right)$$

$$= \gamma Gv\tau_{n+1}^2.$$

Eq. (A.5) shows that the net phase accumulation of all odd echoes for a varied echo time CPMG measurement with a flow-directed gradient is independent of previous echo times for a constant velocity v flow.

FIG. 15 is a diagram of a varied echo time CPMG scheme. During this CPMG measurement, $\tau_n$ would be incremented after every even echo.

Sensors according to some embodiments of the invention may be connected via RF sensor connections 23 to a conventional MR instrument shown as block 22 in FIG. 1(*b*) as a programmed radio frequency pulses, signal acquisition and processing method steps. Signal Processing steps according to some embodiments of the present invention may be implemented as computer-implemented methods in conventional MR instrument hardware or conventional computer hardware and may be implemented separately from signal acquisition steps. Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, an MR instrument.

REFERENCES

[1] Streeter, V. L., and J. Kestin, "Handbook of fluid dynamics," J. Appl. Mech. 28 (4), 640 (1961).

[2] Yamada, M., M. Nakashima, and M. Seki, "Pinched flow fractionation: continuous size separation of particles utilizing a laminar flow profile in a pinched microchannel," Anal. Chem. 76 (18), 5465-5471 (2004).

[3] Chhabra, R. P., and J. F. Richardson, "Non-Newtonian flow and applied rheology: Engineering applications," Butterworth-Heinemann (2011).

[4] Eshtiaghi, N., F. Markis, S. D. Yap, J. C. Baudez, and P. Slatter, "Rheological characterisation of municipal sludge: a review," Water Res. 47 (15), 5493-5510 (2013).

[5] Callaghan, P. T., "Rheo-NMR and velocity imaging," Curr. Opin. Colloid Interface Sci. 11 (1), 13-18 (2006).

[6] Havisto, S., M. J. Cardona, J. Salmela, R. L. Powell, M. J. McCarthy, M. Kataja, and A. I. Koponen, "Experimental investigation of the flow dynamics and rheology of complex fluids in pipe flow by hybrid multi-scale velocimetry," Exp. Fluids 58 (11), 1-13 (2017).

[7] Kim, S. K., "Flow-rate based method for velocity of fully developed laminar flow in tubes." J. Rheol. 62 (6), 1397-1407 (2018).

[8] Coussot, P., "Progress in rheology and hydrodynamics allowed by NMR or MRI techniques," Exp. Fluids 61 (9), 1-20 (2020).

[9] Gladden, L. F., and A. J. Sederman, "Recent advances in flow MRI," J. Magn. Reson. 229, 2-11 (2013).

[10] Edelhoff, D., L. Walczak, S. Henning, F. Weichert, and D. Suter, "High-resolution MRI velocimetry compared with numerical simulations," J. Magn. Reson. 235, 42-49 (2013).

[11] Pope, J. M., and S. Yao, "Quantitative NMR imaging of flow," Concept. Magn. Reson. 5 (4), 281-302 (1993).

[12] Fukushima, E., "Nuclear magnetic resonance as a tool to study flow," Annu. Rev. Fluid Mech. 31 (1), 95-123 (1999).

[13] Elkins, C. J., and M. T. Alley, "Magnetic resonance velocimetry: Applications of magnetic resonance imaging in the measurement of fluid motion," Exp. Fluids 43 (6), 823-858 (2007).

[14] Lim, V., A. M. Hobby, M. J. McCarthy, and K. L. McCarthy, "Laminar mixing of miscible fluids in a SMX mixer evaluated by magnetic resonance imaging (MRI)," Chem. Eng. Sci.137, 1024-1033 (2015).

[15] Gibbs, S. J., D. E. Haycock, W. J. Frith, S. Ablett, and L. D. Hall, "Strategies for rapid NMR rheometry by magnetic resonance imaging velocimetry," J. Magn. Reson. 125 (1), 43-51 (1997).

[16] Wu, D. H., A. I. D. I. Chen, and C. S. Johnson, "Flow imaging by means of 1D pulsed-field-gradient NMR with application to electroosmotic flow," J. Magn. Reson. Series A 115 (1), 123-126 (1995).

[17] Blythe, T. W., A. J. Sederman, J. Mitchell, E. H. Stitt, A. P. E. York, and L. F. Gladden, "Characterising the rheology of non-Newtonian fluids using PFG-NMR and cumulant analysis," J. Magn. Reson. 255, 122-131 (2015).

[18] Blythe, T. W., A. J. Sederman, E. H. Stitt, A. P. York, and L. F. Gladden, "PFG NMR and Bayesian analysis to characterise non-Newtonian fluids," J. Magn. Reson. 274, 103-114 (2017).

[19] Adair, A., S. Richard, and B. Newling, "Gas and liquid phase imaging of foam flow using pure phase encode magnetic resonance imaging," Molecules 26 (1), 28 (2021).

[20] Zhang, J., and B. J. Balcom, "Magnetic resonance imaging of two-component liquid-liquid flow in a circular capillary tube," Phys. Rev. E 81 (5), 056318 (2010).

[21] Li, T. Q., J. D. Seymour, R. L. Powell, K. L. McCarthy, L. Ödberg, and M. J. McCarthy, "Turbulent pipe flow studied by time-averaged NMR imaging: measurements of velocity profile and turbulent intensity," Magn. Reson. Imaging 12 (6), 923-934 (1994).

[22] Gach, H. M., and I. J. Lowe, "Characterization of flow emerging from a stenosis using MRI," Magn. Reson. Med. 40 (4), 559-570 (1998).

[23] Newling, B., C. C. Poirier, Y. Zhi, J. A. Rioux, A. J. Coristine, D. Roach, and B. J. Balcom, "Velocity imaging of highly turbulent gas flow," Phy. Rev. Lett. 93 (15), 154503 (2004).

[24] Tayler, A. B., D. J. Holland, A. J. Sederman, and L. F. Gladden, "Exploring the origins of turbulence in multiphase flow using compressed sensing MRI," Phys. Rev. Lett. 108 (26), 264505 (2012).

[25] Gummerson, R. J., C. Hall, W. D. Hoff, R. Hawkes, G. N. Holland, and W. S. Moore, "Unsaturated water flow within porous materials observed by NMR imaging," Nature 281 (5726), 56-57 (1979).

[26] Granwehr, J., E. Harel, S. Han, S. Garcia, A. Pines, P. N. Sen, and Y. Q. Song, "Time-of-flight flow imaging using NMR remote detection," Phys. Rev. Lett. 95 (7), 075503 (2005).

[27] Li, L., Q. Chen, A. E. Marble, L. Romero-Zerón, B. Newling, and B. J. Balcom, "Flow imaging of fluids in porous media by magnetization prepared centric-scan SPRITE," J. Magn. Reson. 197 (1), 1-8 (2009).

[28] Suryan, G., "Nuclear resonance in flowing liquids," In Proceedings of the Indian Academy of Sciences-Section A, Springer India (1951).

[29] Singer, J. R., "Blood flow rates by nuclear magnetic resonance measurements," Science 130 (3389), 1652-1653 (1959).

[30] Hirschel, L. R., and L. F. Libelo, "NMR signal dependence on fluid velocity," J. Appl. Phys. 33 (5), 1895-1896 (1962).

[31] Arnold, D. W., and L. E. Burkhart, "Spin-echo NMR response from a flowing sample," J. Appl. Phys. 36 (3), 870-871 (1965).

[32] Stejskal, E. O., "Use of spin echoes in a pulsed magnetic-field gradient to study anisotropic, restricted diffusion and flow," J. Chem. Phys. 43 (10), 3597-3603 (1965).

[33] Grover, T., and J. R. Singer, "NMR spin-echo flow measurements," J. Appl. Phys. 42 (3), 938-940 (1971).

[34] Hayward, R. J., K. J. Packer, and D. J. Tomlinson, "Pulsed field-gradient spin echo NMR studies of flow in fluids," Mol. Phys. 23 (6), 1083-1102 (1972).

[35] Song, Y. Q., and U. M. Scheven, "An NMR technique for rapid measurement of flow," J. Magn. Reson. 172 (1), 31-35 (2005).

[36] Fridjonsson, E. O., P. L. Stanwix, and M. L. Johns, "Earth's field NMR flow meter: Preliminary quantitative measurements," J. Magn. Reson. 245, 110-115 (2014).

[37] Osán, T. M., J. M. Ollé, M. Carpinella, L. M. C. Cerioni, D. J. Pusiol, M. Appel, J. Freeman, and I. Espejo, "Fast measurements of average flow velocity by Low-Field $^1$H NMR," J. Magn. Reson. 209 (2), 116-122 (2011).

[38] Richard, S. J., and B. Newling, "Measuring flow using a permanent magnet with a large constant gradient," Appl. Magn. Reson. 50 (5), 627-635 (2019).

[39] Chen, W., L. Xiao, H. Liu, G. Liao, W. Liu, Y. Zhang, Q. Wu, Z. Sun, and W. Zheng, "Design and implementation of a robust NMR fluid analyzer with multiple antennas," Appl. Magn. Reson. 50 (1), 263-275 (2019).

[40] O'Neill, K. T., E. O. Fridjonsson, P. L. Stanwix, and M. L. Johns, "Quantitative velocity distributions via nuclear magnetic resonance flow metering," J. Magn. Reson. 269, 179-185 (2016).

[41] O'Neill, K. T., A. Klotz, P. L. Stanwix, E. O. Fridjonsson, and M. L. Johns, "Quantitative multiphase flow characterisation using an Earth's field NMR flow meter," Flow Meas. Instrum. 58, 104-111 (2017).

[42] O'Neill, K. T., L. Brancato, P. L. Stanwix, E. O. Fridjonsson, and M. L. Johns, "Two-phase oil/water flow measurement using an Earth's field nuclear magnetic resonance flow meter," Chem. Eng. Sci. 202, 222-237 (2019).

[43] Hinch, E. J., *Lecture 3: Simple Flows* (Woods Hole Oceanographic Institution, https://gfd.whoi.edu/wp-content/uploads/sites/18/2018/03/lecture03_28327.pdf, 2018).

[44] Packer, K. J., "The study of slow coherent molecular motion by pulsed nuclear magnetic resonance," Mol. Phys. 17 (4), 355-368 (1969).

[45] Callaghan, P. T., "Translational dynamics and magnetic resonance: Principles of pulsed gradient spin echo NMR," Oxford University Press (2011).

[46] Archibald, R., and A. Gelb, "A method to reduce the Gibbs ringing artifact in MRI scans while keeping tissue boundary integrity," IEEE Trans. Med. Imaging 21 (4), 305-319 (2002).

[47] Zhong, L., M. Oostrom, M. J. Truex, V. R. Vermeul, and J. E. Szecsody, "Rheological behavior of xanthan gum solution related to shear thinning fluid delivery for subsurface remediation," J. Hazard. Mater. 244, 160-170 (2013).

[48] Coulson, J. M., J. F. Richardson, J. R. Backhurst, and J. H. Harker, "Fluid flow, heat transfer and mass transfer," Butterworth-Heinemann (1999).

[49] Benson, T. B., and P. J. McDonald, "Profile amplitude modulation in stray-field magnetic-resonance imaging," J. Magn. Reson. Series A 112 (1), 17-23 (1995).

We claim:

1. A magnetic resonance method for characterizing a pattern of flow of a flowing fluid comprising the steps of:

flowing the fluid through a conduit wherein the fluid comprises a direction of flow and a central axis of the direction of flow, wherein a segment of the conduit defines a measurement volume and the conduit comprises a radius;

subjecting the flowing fluid in the measurement volume to a magnetic field gradient in the direction of flow of the fluid, wherein the magnetic field gradient in the direction of flow comprises a fixed value in the measurement volume and the magnetic field gradient is generated by at least two opposing non-parallel permanent magnets equally inclined with respect to the central axis of the direction of flow; and radio frequency excitation pulses generating a signal comprising a series of echoes having an echo time;

acquiring at least one odd echo from the series of echoes, wherein the at least one odd echo comprises signals from streamlines in the flowing fluid in the measurement volume;

determining an average velocity of the flowing fluid;

processing the signals from the streamlines to determine a flow behaviour index for the flowing fluid; and calculating velocity as a function of the radius of the conduit using the flow behaviour index and the average velocity and relating the function to the pattern of flow to characterize the pattern of flow exhibited by the flowing fluid wherein the average velocity is calculated using the equation $$\phi_{odd} = \frac{\int\int \phi r dr d\theta}{\int\int r dr d\theta} = \frac{\int_0^R \phi r dr}{\int_0^R r dr} = \frac{\int_0^R (\gamma Gv(r)\tau^2) r dr}{\int_0^R r dr}$$

-continued $$= \gamma G\tau^2 \frac{\int_0^R \left(v_{max}\left(1 - \frac{r^m}{R^m}\right)\right) r dr}{\int_0^R r dr} = \frac{m}{m+2} v_{max} \gamma G\tau^2$$

$$= \gamma Gv_{avg}\tau^2,$$

wherein r is the radial position;

$\phi$ are phase accumulation;

$\phi_{odd}$ is the net phase accumulation of odd echoes;

$\gamma$ is the gyromagnetic ratio;

v(r) is the flow velocity on a radial position r, $v_{avg}$ is the average velocity;

$v_{max}$ is the maximum flow velocity;

R is the radius of a circular pipe;

rdrd$\theta$ is differential of cross-sectional area;

m is a laminar flow parameter;

$\tau$ is the time interval between pulses;

G is a constant magnetic field gradient in the direction of flow;

and the flow behavior index is determined by fitting to the equation $$M_\phi = \sqrt{(S_{Re})^2 + (S_{Im})^2} =$$

$$\frac{2}{mX^{\frac{2}{m}}} \sqrt{\left(\Gamma\left(\frac{2}{m}\right) - \Gamma\left(\frac{2}{m}, -Xi\right)\right)\left(\Gamma\left(\frac{2}{m}\right) - \Gamma\left(\frac{2}{m}, -Xi\right)\right)}$$

wherein $M_\phi$ is the normalized magnitude of odd echoes;

$S_{Re}$ is the normalized real signal;

$S_{Im}$ is the imaginary signal;

$\Gamma$ is a gamma distribution function according to the equation $$\Gamma(a, x) = \int_x^\infty w^{a-1} e^{-w} dw;$$

and

X is determined by the equation $$X = \frac{m+2}{m} \gamma Gv_{avg}\tau^2.$$

2. The method of claim 1, wherein the step of determining the average velocity comprises:

processing the signals from the streamlines to obtain a phase shift value and calculating the average velocity using the phase shift value.

3. The method of claim 1, wherein the radio frequency excitation pulses are applied as part of a Carr-Purcell-Meiboom-Gill magnetic resonance measurement and the at least one odd echo comprises a plurality of odd echoes.

4. The method of claim 1, wherein a second segment of the conduit defines a pre-polarization volume immediately upstream of the measurement volume; and the method further comprises subjecting the flowing fluid in the pre-polarization volume to at least one pre-polarization magnetic field.

5. The method of claim 1, wherein the step of determining the average velocity comprises calculating the average velocity from a provided flow rate of the flowing fluid and a provided diameter of the conduit in the segment of measurement volume.

6. The method of claim 1, wherein the echo time is varied.

7. A computer-implemented method for characterizing a pattern of flow of a flowing fluid in a conduit comprising a radius, wherein the fluid comprises a direction of flow and a central axis of the direction of flow, comprising:

using a processor for processing at least one odd echo acquired from radio frequency pulses of a measurement volume containing the flowing fluid, wherein the radio frequency pulses are applied as part of an echo train measurement, and wherein the flowing fluid is subjected to a magnetic field gradient generated by at least two opposing non-parallel permanent magnets equally inclined with respect to the central axis of the direction of flow, or a switched magnetic field that is turned on with a stable value, and left on for the duration of the echo train measurement, and wherein the echo includes signals from streamlines in the flowing fluid in the measurement volume;

processing the signals to determine a flow behaviour index for the flowing fluid; and, determining an average velocity of the flowing fluid, and calculating velocity as a function of the radius of the conduit using the flow behaviour index and the average velocity and relating the function to a pattern of flow to characterize the pattern of flow exhibited by the flowing fluid, wherein the average velocity is calculated using the equation $$\phi_{odd} = \frac{\int\int \phi r dr d\theta}{\int\int r dr d\theta} = \frac{\int_0^R \phi r dr}{\int_0^R r dr} = \frac{\int_0^R \left(\gamma G v(r) \tau^2\right) r dr}{\int_0^R r dr}$$

$$= \gamma G \tau^2 \frac{\int_0^R \left(v_{max}\left(1 - \frac{r^m}{R^m}\right)\right) r dr}{\int_0^R r dr} = \frac{m}{m+2} v_{max} \gamma G \tau^2$$

$$= \gamma G v_{avg} \tau^2,$$

wherein r is the radial position;

$\phi$ are phase accumulation;

$\phi_{odd}$ is the net phase accumulation of odd echoes;

$\gamma$ is the gyromagnetic ratio;

v(r) is the flow velocity on a radial position r;

$v_{avg}$ is the average velocity;

$v_{max}$ is the maximum flow velocity;

R is the radius of a circular pipe;

rdr$\theta$ is differential of cross-sectional area;

m is a laminar flow parameter;

$\tau$ is the time interval between pulses;

G is a constant magnetic field gradient in the direction of flow;

and the flow behavior index is determined by fitting to the equation $$M_\phi = \sqrt{(S_{Re})^2 + (S_{Im})^2} =$$

$$\frac{2}{mX^{\frac{2}{m}}}\sqrt{\left(\Gamma\left(\frac{2}{m}\right) - \Gamma\left(\frac{2}{m}, -Xi\right)\right)\left(\Gamma\left(\frac{2}{m}\right) - \Gamma\left(\frac{2}{m}, -Xi\right)\right)}$$

wherein $M_\phi$ is the normalized magnitude of odd echoes;

$S_{Re}$ is the normalized real signal;

$S_{Im}$ is the imaginary signal;

$\Gamma$ is a gamma distribution function according to the equation $$\Gamma(a, x) = \int_x^\infty w^{a-1} e^{-w} dw;$$

and

X is determined by the equation $$X = \frac{m+2}{m} \gamma G v_{avg} \tau^2.$$

8. A magnetic resonance method for characterizing a pattern of flow of a flowing fluid comprising the steps of:

flowing the fluid through a conduit wherein the fluid comprises a direction of flow and a central axis of the direction of flow, wherein a segment of the conduit defines a measurement volume and the conduit comprises a radius;

subjecting the flowing fluid in the measurement volume to a magnetic field gradient in the direction of flow of the fluid, wherein the magnetic field gradient in the direction of flow comprises a fixed value in the measurement volume; and radio frequency excitation pulses generating a signal comprising a series of echoes having an echo time, wherein the radio frequency excitation pulses are applied as part of an echo train measurement;

and wherein the magnetic field gradient is generated by a switched magnetic field that is turned on with a stable value, and left on for the duration of the echo train measurement;

acquiring at least one odd echo from the series of echoes, wherein the at least one odd echo comprises signals from streamlines in the flowing fluid in the measurement volume;

determining an average velocity of the flowing fluid;

processing the signals from the streamlines to determine a flow behaviour index for the flowing fluid; and calculating velocity as a function of the radius of the conduit using the flow behaviour index and the average velocity and relating the function to the pattern of flow to characterize the pattern of flow exhibited by the flowing fluid, wherein the step of calculating the velocity further comprises calculating the average velocity is calculated using the equation $$\phi_{odd} = \frac{\int\int \phi r dr d\theta}{\int\int r dr d\theta} = \frac{\int_0^R \phi r dr}{\int_0^R r dr} = \frac{\int_0^R \left(\gamma G v(r) \tau^2\right) r dr}{\int_0^R r dr}$$

-continued $$= \gamma G \tau^2 \frac{\int_0^R \left( v_{max} \left( 1 - \frac{r^m}{R^m} \right) \right) r dr}{\int_0^R r dr} = \frac{m}{m+2} v_{max} \gamma G \tau^2$$

$$= \gamma G v_{avg} \tau^2,$$

wherein r is the radial position;

$\phi$ are phase accumulation;

$\phi_{odd}$ is the net phase accumulation of odd echoes;

$\gamma$ is the gyromagnetic ratio;

v(r) is the flow velocity on a radial position r, $v_{avg}$ is the average velocity;

$v_{max}$ is the maximum flow velocity;

R is the radius of a circular pipe;

rdrd$\theta$ is differential of cross-sectional area;

m is a laminar flow parameter;

$\tau$ is the time interval between pulses;

G is a constant magnetic field gradient in the direction of flow;

and the flow behavior index is determined by fitting to the equation $$M_\phi = \sqrt{(S_{Re})^2 + (S_{Im})^2} =$$

$$\frac{2}{m X^{\frac{2}{m}}} \sqrt{\left( \Gamma\left(\frac{2}{m}\right) - \Gamma\left(\frac{2}{m}, -Xi\right) \right) \left( \Gamma\left(\frac{2}{m}\right) - \Gamma\left(\frac{2}{m}, -Xi\right) \right)}$$

wherein $M_\phi$ is the normalized magnitude of odd echoes;

$S_{Re}$ is the normalized real signal;

$S_{Im}$ is the imaginary signal;

$\Gamma$ is a gamma distribution function according to the equation $$\Gamma(a, x) = \int_x^\infty w^{a-1} e^{-w} dw;$$

and

X is determined by the equation $$X = \frac{m+2}{m} \gamma G v_{avg} \tau^2.$$

\* \* \* \* \*